United States Patent [19]

Foster et al.

[11] Patent Number: 5,596,697
[45] Date of Patent: Jan. 21, 1997

[54] METHOD FOR ROUTING ITEMS WITHIN A COMPUTER SYSTEM

[75] Inventors: Gregg S. Foster, Woodside; John R. Meier, Cupertino; Stephen P. Capps, San Carlos, all of Calif.

[73] Assignee: Apple Computer, Inc., Cupertino, Calif.

[21] Appl. No.: 130,049

[22] Filed: Sep. 30, 1993

[51] Int. Cl.$^6$ .................................................. G06F 15/00
[52] U.S. Cl. ........................ 395/340; 395/348; 395/352; 395/358
[58] Field of Search .................................. 395/155–157, 395/159, 160, 161

[56] References Cited

U.S. PATENT DOCUMENTS

| | | | |
|---|---|---|---|
| 5,165,012 | 11/1992 | Crandall et al. | 395/156 |
| 5,230,063 | 7/1993 | Hoeber et al. | 395/156 |
| 5,241,303 | 8/1993 | Register et al. | 340/706 |
| 5,287,514 | 2/1994 | Gram | 395/700 |
| 5,309,555 | 5/1994 | Akins et al. | 395/157 |
| 5,327,486 | 7/1994 | Wolff et al. | 379/96 |
| 5,333,266 | 7/1994 | Boaz et al. | 395/200 |
| 5,345,543 | 9/1994 | Capps et al. | 395/137 |
| 5,345,550 | 9/1994 | Bloomfield | 395/156 |
| 5,379,340 | 1/1995 | Overend et al. | 379/93 |
| 5,398,276 | 3/1995 | Leinke et al. | 379/21 |
| 5,404,442 | 4/1995 | Foster et al. | 395/159 |

OTHER PUBLICATIONS

O'Connor, Rory J., "Apple Banking on Newton's Brain", Apr. 22, 1992 San Jose Mercury News.

Weiman, Liza and Moran, Tom, "A Step toward the Future", Macworld Magazine, pp. 129–131, Aug. 1992.

Soviero, Marcelle M., "Your World According to Newton", Popular Science, Magazine, pp. 45–49, Sep. 1992.

Abatemarco, Fred, "From the Editor", Sep. 1992, Popular Science Magizine.

*Primary Examiner*—Mark R. Powell
*Assistant Examiner*—Huynh Ba
*Attorney, Agent, or Firm*—Hickman Beyer & Weaver, LLP.

[57] ABSTRACT

A method and apparatus are provided for routing information with a pointer-based computer such as a pen-based computer. The routing actions may be faxing, printing, mailing (electronically), and beaming (by infrared light). The routed information may be document or other item produced by or associated with a particular application running on the computer. Routing actions that send items out of the computer system preferably are processed according to the following steps. First one or more menus or windows associated with the application of the document being routed are displayed on a display screen of the computer. At least one of these menus or windows contains a list of routing actions available to the application. The user selects one of these routing actions and, in some cases, provides additional information pertaining to the destination, format, etc. of the document being routed. Then the document or item being routed is transferred to an out box which resides, at least in part, in the memory of the computer system. The out box is communication with a plurality of ports such as a modem, an IR beam transceiver, etc. From the out box, the item is routed out of the computer system and through one of the ports and the process is concluded.

29 Claims, 17 Drawing Sheets

METHOD FOR ROUTING ITEMS WITHIN A COMPUTER SYSTEM

BACKGROUND OF THE INVENTION

The present invention relates generally to computer systems, and more particularly to methods and systems for routing information within a computer system.

Computerized personal organizers are becoming increasingly popular. They perform such functions as keeping calendars, address books, to-do lists, etc. While these functions can be provided by conventional computer systems, they are more conveniently provided by personal organizers which are relatively inexpensive, small, and lightweight (i.e. portable). Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function displays of pen-based computer systems permit users to operate the computers as computerized notepads. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, the "ink" can be identified as text and numeric information.

The information input via the pen or stylus can be interpreted (e.g., recognized as handwriting) or otherwise manipulated by the computer system and the processes it employs. Some powerful pen-based computer systems employ "objects" having certain attributes which can be queried. And some of these same systems employ "frame systems" in which frame objects are related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985. A particular advantage of frame systems is that the frames (e.g. documents) can be easily accessed and used by any application in the computer system.

Many users must send information to sources outside of a computer they are currently using. Similarly, many users must receive information from sources outside of their computer. The outside sources and destinations may be other computer systems located in other cities or even countries. To accommodate such users, some pen-based computers have extensive built-in communications capabilities for routing information. These capabilities allow the user to send and receive information over, for example, phone lines (by modem), infra-red light beams, and/or radio-frequency electromagnetic waves. The transmitted information may take the form of facsimiles, electronic mail messages, etc. Pen-based computers having such capabilities include a user interface that allows the user to initiate the sending, receiving, and routing actions.

Some conventional desktop computers have graphical user interfaces that allow users to control these functions through menus, dialog boxes, etc. Although such desktop computers contain user interfaces allowing the user to conveniently send and receive information, other interfaces would be desirable to suit the styles of a variety of users. Further, it would be especially desirable to have user interfaces and development environments that take advantage of the power of the object and frame structures now employed in some pen-based computer operating systems. Thus, them remains a need for new and different user interfaces that take advantage of the strengths of some pen-based computer systems.

SUMMARY OF THE INVENTION

The present invention provides a method and apparatus for routing information with a pointer-based computer such as a pen-based computer. The routing actions include, for example, faxing, printing, mailing (electronically), and beaming (by infrared light). The routed information is generally a document or other item produced by or associated with a particular application running on the computer. Routing actions that send items out of the computer system preferably are processed according to the following steps. First one or more menus or windows associated with the document being routed (or the application in which the document was created) are displayed on a display screen of the computer. At least one of these menus or windows contains a list of routing actions available to the application. The user selects one of these routing actions and, in some cases, provides additional information pertaining to the destination, format, etc. of the document being routed. Then the document or item being routed is transferred to an out box which resides, at least in part, in the memory of the computer system. Further, the out box is communication with a plurality of hardware ports such as a modem, an IR beam transceiver, etc. From the out box, the item is routed out of the computer system and through one of the ports and the process is concluded.

Within the computer system two stored lists control the content of the menus and the windows associated with the routing process. The first of these, an "action list", contains scripts specifying, for example, what routing actions are available to a particular application and therefore what routing processes are displayed on an action menu associated with that application. The second stored list is an "out box category list" which contains a list of all items currently residing in the out box and the routing action associated with each such item. In some embodiments, a window representing the out box is automatically displayed on the display screen of the computer system when an item enters the out box. In other embodiments, the user will need to "open" the out box in order display the out box window. In either case, the dialog and other information found in the out box window is specified in the out box category list.

One aspect of the present invention provides a method of routing an item according to the following steps. First, a routing action menu is displayed which allows the user to select a particular type of routing action such as e.g. printing or faxing. The action menu may be displayed in response to a user selecting a routing action button or other icon displayed on the screen. After the particular routing action type is selected, a routing slip is displayed to allow the user to specify certain details of the routing action such as to whom the document will be sent and what format the document should take. For example, the routing slip may contain fields describing the destination or format of the document being routed. A destination could be an E-mail address, facsimile number of a business acquaintance, etc. A format could be plain, memorandum, business letter, etc. In addition to the information about the document, the routing slip typically contains an execute button which when selected causes the document or a substantial duplicate thereof to be directed to an out box. The out box (or more precisely a window representing the out box) is then displayed. The out box window has separate regions for all available types of routing actions in the pointer-based computer, and within each such region, entries are listed for the documents that have been sent to the out box. Finally, the routing action is performed in response to one or more selection gestures in the window. This is typically performed after the user has selected either the item to be routed in the out box or a "send" button displayed within the out box.

Another aspect of the invention provides a method of routing items into the computer system from an external source. In this method, an "in box" —which is in many ways analogous to the out box—receives items that have faxed, mailed, beamed, etc. to the system. The in box then stores the items until the user selects one or more of these items to be "put away" in files (i.e., memory locations associated with particular applications). In preferred embodiments, the application associated with the selected item will be opened when the item is put away.

In still another aspect, the present invention provides a stylus-based computer system including the following elements: (1) a processor such as a CPU; (2) a memory coupled to the processor; (3) a display coupled to said processor; (4) communications ports; (5) computer implemented routing processes which run on the processor and reside, at least in part, in the memory; (6) an out box in communication with the communications ports and temporarily holding documents being routed by the routing processes; (7) an out box window representing the out box and containing a list of documents held in the out box; and (8) an out box categories list containing instructions for dialog appearing in the out box window and other windows associated with the out box.

Compared to prior systems, the present invention allows streamlined development of routing action interfaces for new applications. Further, the present invention provides a flexible approach to routing various types of documents through various ports. Each application in a computer system of this invention can access the centralized action list which specifies a consistent routing action interface. Thus, a new application can employ standard action menus and routing slips by simply adding a few lines of script to the action list. For instance, if a new application supports faxing, mailing, and beaming, the action list can be modified to specify that these routing actions are supported by the application. Then when the action menu is selected, faxing, mailing, and beaming will be listed. Similarly, the dialog in a routing slip for a new application can be specified by adding a few lines of script to the action list. These features allow developers to create applications with only minimal concern about the interface for routing actions.

The out box and in box of the present invention provide considerable flexibility to the routing process by remaining independent of the computer system's applications. The out box handles instructions to beam a calendar record through an IR beam port as well as fax a notepad note through a modem. Thus, the individual applications do not need to participate in the routing process after the documents are delivered to the out box. An application need only specify what routing actions it will support (and have them displayed on the action menu) and what the entries will appear on a routing slip.

A further understanding of the present invention will be had upon reading the following detailed description and studying the associated drawings.

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
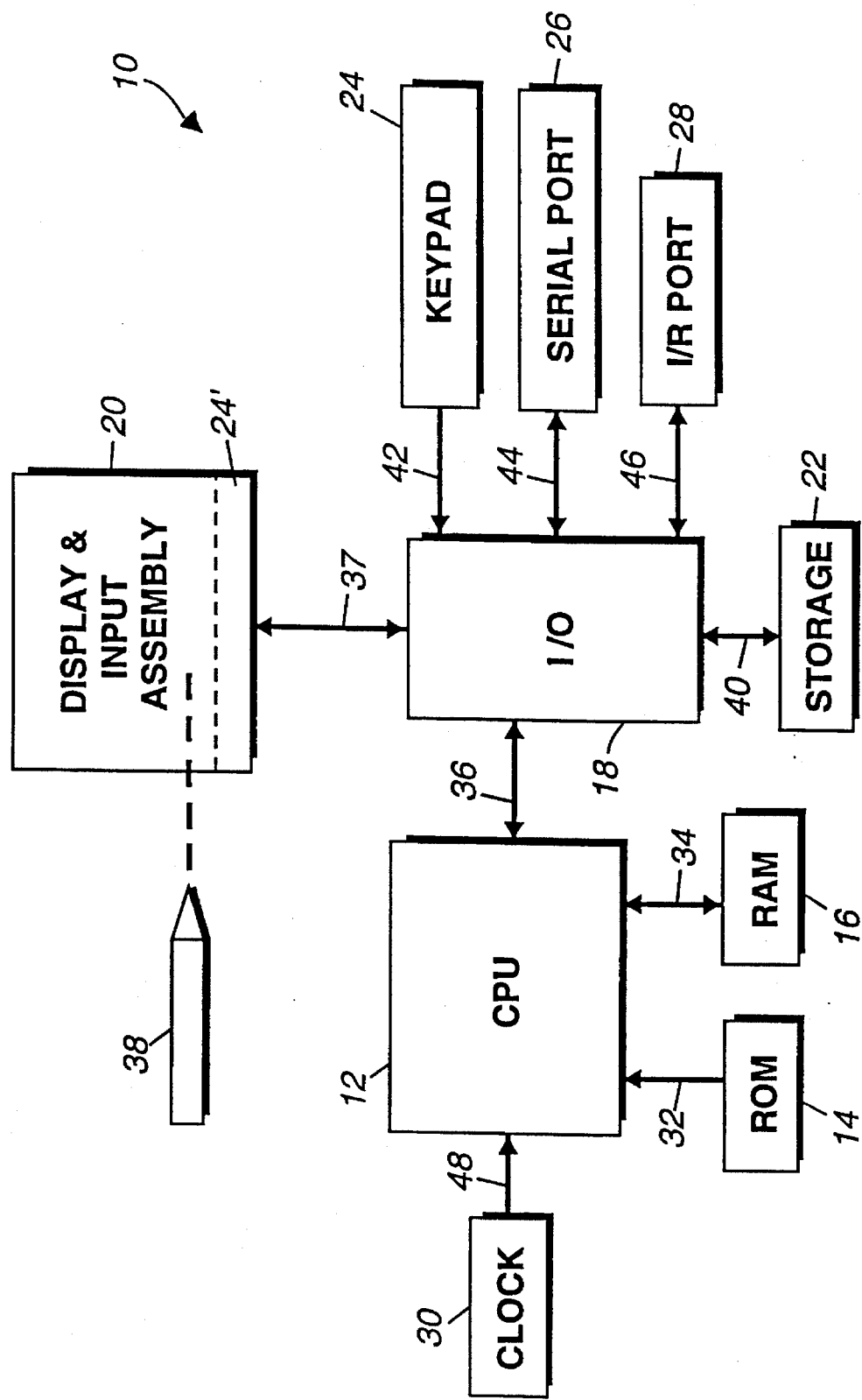
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also commercially available. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
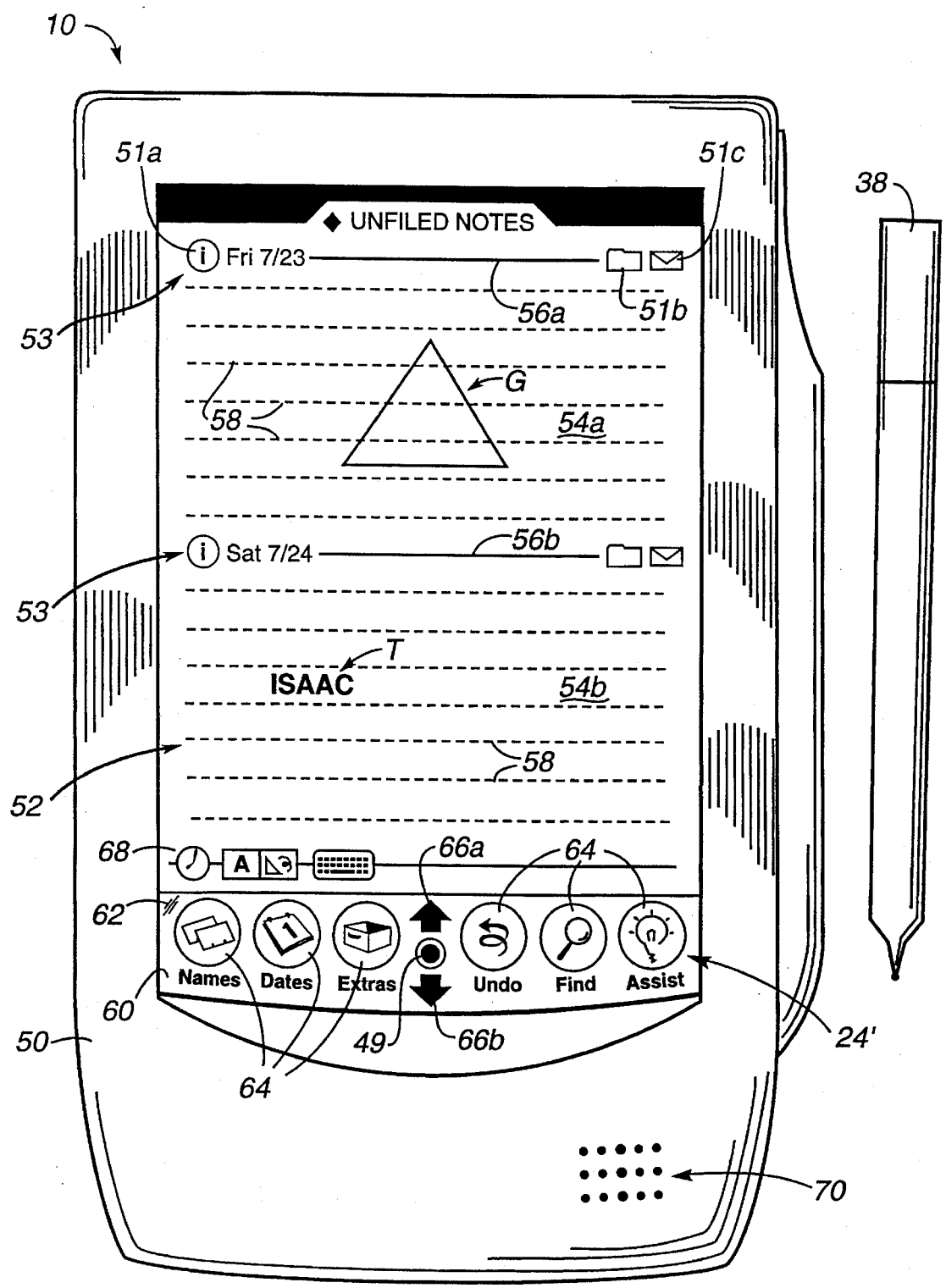
FIG. 2 is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices. Although infrared radiation is used to "beam" information in preferred embodiments of this invention, other forms of electromagnetic energy can in alternative embodiments.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 30 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

Upon power-up, pen based computer system 10 displays on screen 52 an initial "note" area 54a including a header 53 and a number of guidelines 58. The header 53 preferably includes a header bar 56a, the date of creation of the note area 54a, and one or more icons and "soft" dedicated header function buttons 51A, 51B, and 51C. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

A status bar 68 is provided at the bottom of the notepad application. The status bar 68 is provided with a number of active and display areas, which is not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64, an "overview button" 49, and a pair of scroll buttons 66a and 66b. The operation of the note areas 54a, 54b, etc., scroll buttons 66a and 66b, and other aspects of computer system 10 are discussed in greater detail in U.S. patent application Ser. No. 07/868,013, filed Apr. 13, 1992 on behalf of Tchao et al., assigned to the assignee of the present invention and incorporated herein by reference in its entirety. The function buttons 64 include an address button ("Names"), a calendar button ("dates"), a drawer button ("extras"), an undo button, a find button, and an assist button.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program. When the notepad application is running, the address button (names) can then be used to launch an address book application program. That is, when the address button is depressed, a suitable address book application program is opened and a suitable address book dialog box is displayed on screen 52. Similarly, the calendar button (dates) launches a calendar application program when depressed.

The "Find" button is used to initiate a search for information. The undo button will undo the latest user action when depressed and will undo the last two actions if depressed a second time without the intervention of any additional user actions. The assist button gives the user access to a help menu which is designed to provide operating instructions to the user that may be helpful when the user is unsure of how to operate the computing system.

Figure 3:
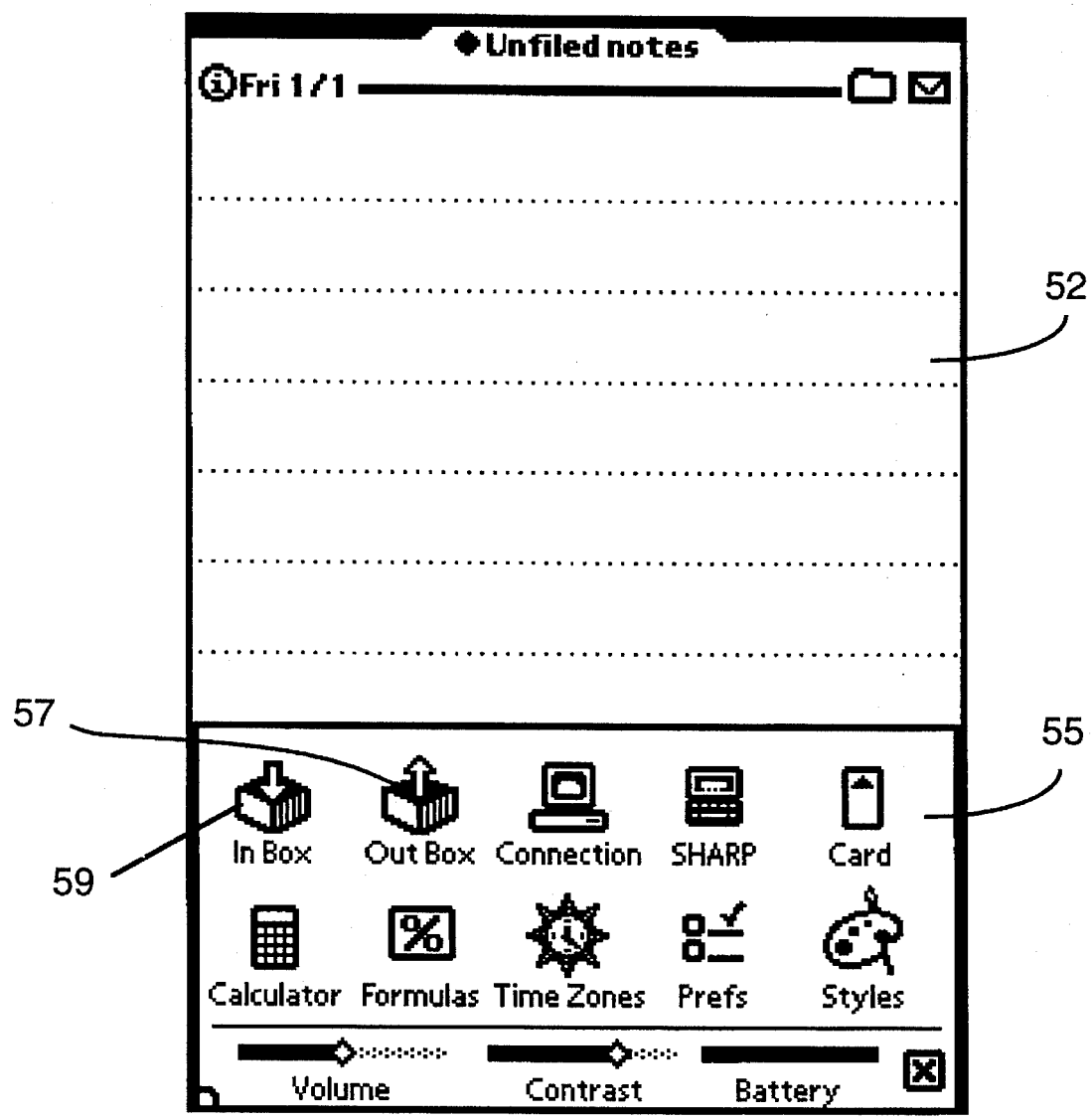
FIG. 3 is an illustration of the computer system's display screen displaying a window containing a collection of icons for various applications in the computer system.

A "drawer", which is opened by pressing the drawer button ("extras") is used to store other application programs, tools, access buttons to external ROM cards, communications applications and other items that can be utilized by the user. When the drawer is "opened", a drawer dialog box 55 is displayed on the screen 52 as shown in FIG. 3. The user can then launch any application stored therein merely by tapping on the associated icon that is displayed within the drawer dialog box. Thus, the icons serve as "soft buttons" which may be activated by tapping the screen at a location corresponding to the displayed position of the icon. Of course, in alternative embodiments, the particular applications that are accessed by keypad buttons can be varied widely. For example, additional keys could be added, existing keys removed, and/or the above described keys could be used to launch different applications.

A plurality of application programs (sometimes referred to as packages) may be stored in the system's memory. By way of example, the notepad, a calendar application, an address book application, a to-do list application and a variety of other application programs may be provided. The memory may be divided into two or more discrete sections (sometimes referred to as stores herein), which represent separately addressable segments of memory. By way of example, internal RAM that acts as a first portion of memory may be considered one store. A PCMCIA card, which can be a part of mass storage 22, may be considered a second store. Within each store, much of the data may be divided into a plurality of different record files (sometimes called soups herein). The record files each include a number of records that are to be used with one or more of the specific application files. In one suitable embodiment, each page (screen-full) of text constitutes a separate record, with each record being given a record number that is unique within that application file. Thus, for example, within the calendar application file, there may initially be thirty records. These records would be given record numbers zero to twenty-nine, respectively.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include document or item objects which contain information to be routed. There are many well known texts which describe object oriented programming. See, for example, *Object Oriented Programming for the Macintosh*, by Kurt J. Schmucher, Hayden Book Company, 1986. In the present invention, objects are preferably implemented as part of a frame system that comprises frame objects related by a semantic network. As noted above, a description of semantic networks can be found in "A Fundamental Tradeoff in Knowledge Representation and Reasoning", *Readings in Knowledge Representation*, by Brachman and Leveseque, Morgan Kaufman, San Mateo, 1985.

Graphic elements are sometimes used in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

It is noted that within this application reference may be made to "tapping", "clicking on", "depressing", "pressing" or otherwise performing a selection gesture on an object. These phrases are intended to interchangeably refer to the act of selecting the object. The term tapping is generally used in reference to the physical act of touching (or at least bringing into close proximity) the stylus of a pen-based computing system to the screen and shortly thereafter lifting the stylus from the screen (i.e. within a predetermined period of time) without moving the stylus any significant amount (i.e. less than a predetermined amount, as for example six pixels). This is a typical method of selecting objects in a pen-based computing system. The term "clicking on" is intended to be broader in scope and is intended to cover not only tapping, but also the action of selecting an object using a button associated with a mouse or track ball as well as the selection of an object using any other pointer device.

A preferred embodiment of this invention will now briefly be described in the context of the figures depicting screen 52. These figures will be described in more detail below.

Figure 5:
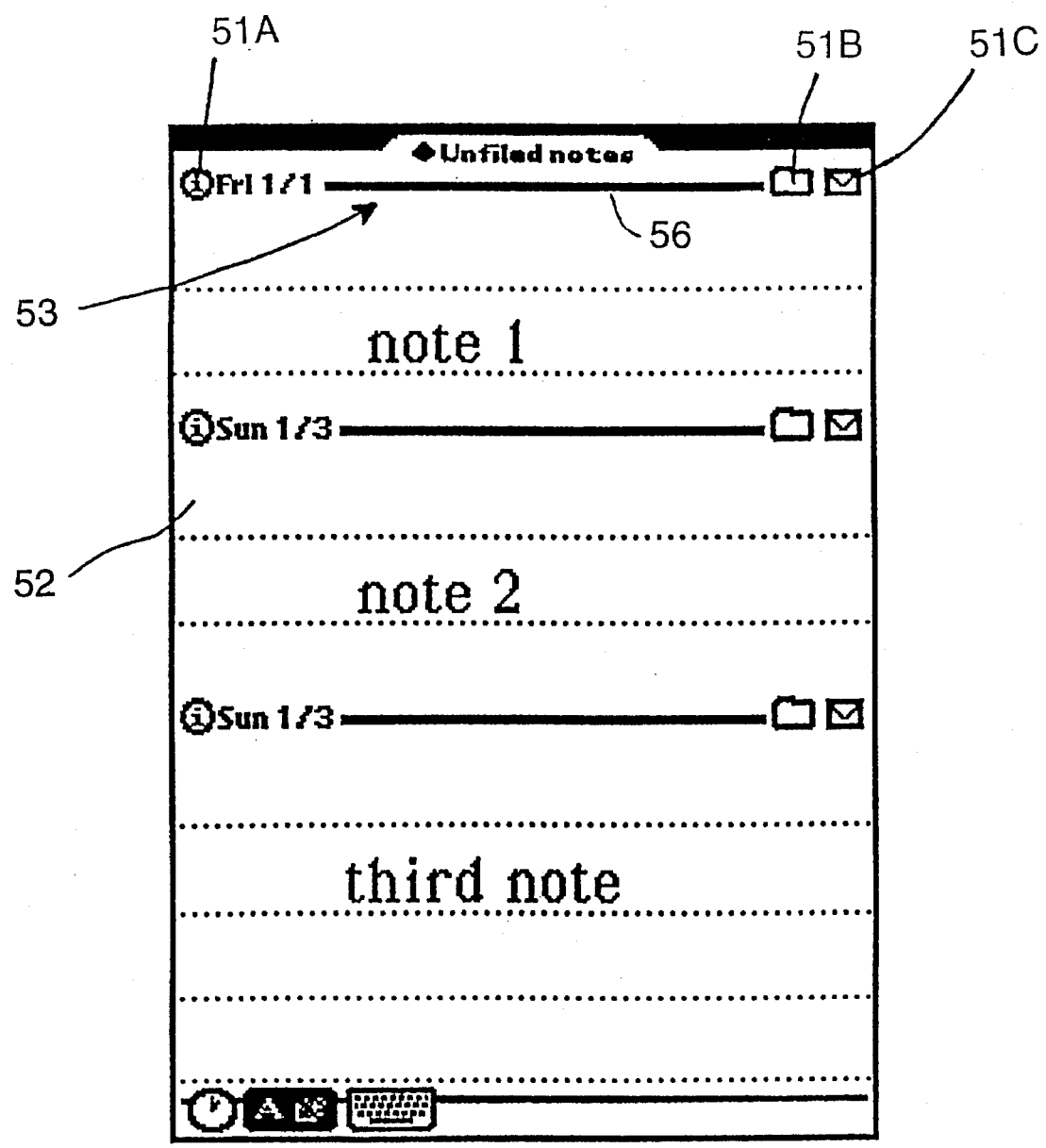
FIG. 5 is an illustration of the computer system's display screen displaying three "notes" created within a "note pad" application.
Figure 6:
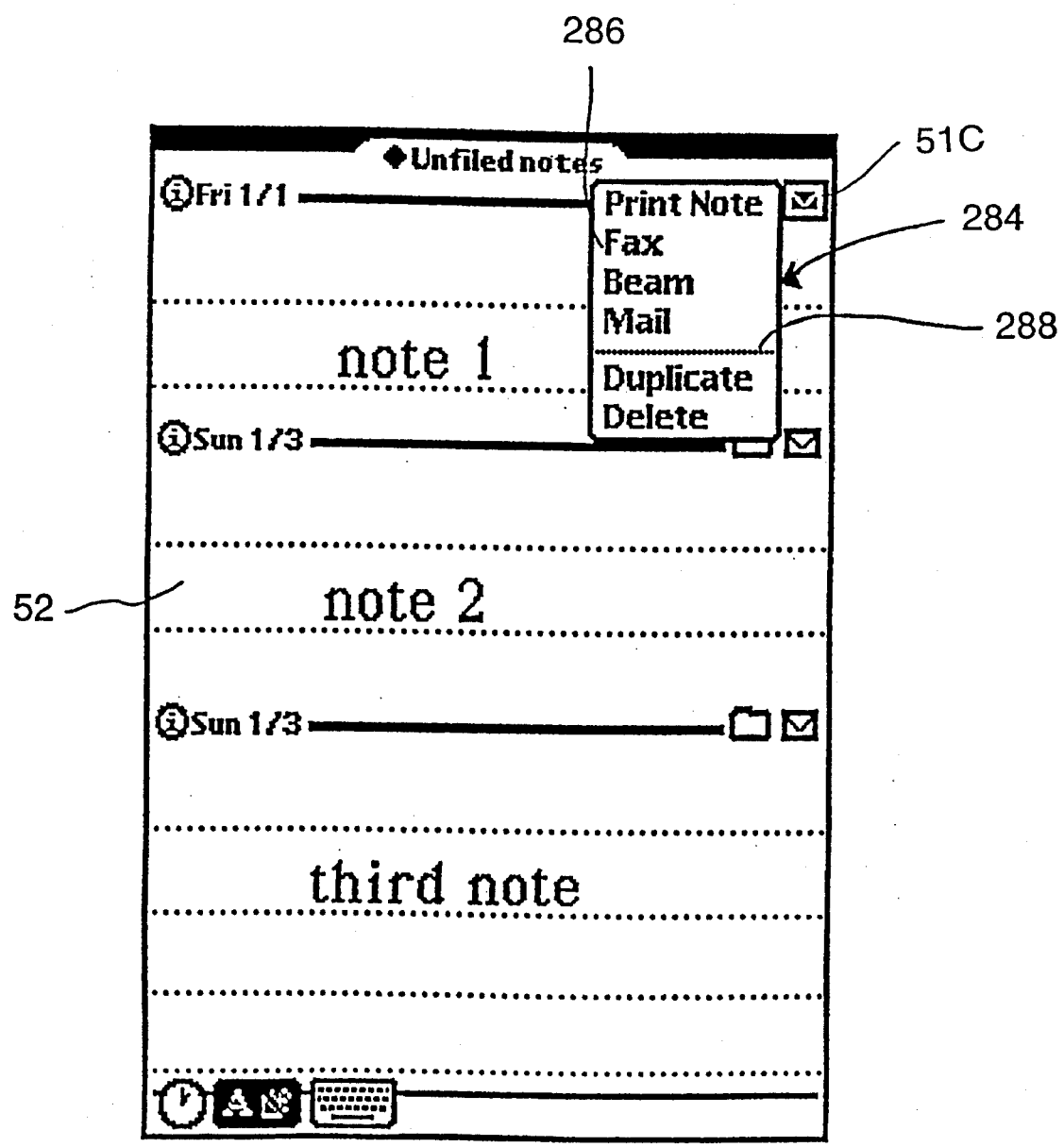
FIG. 6 is an illustration of the display screen of FIG. 5 showing an "action menu" that appears after a routing action button has been selected.

Initially, the user will have prepared one or more documents (or records or items) he or she may wish to route one or more of them to another location. To do so, the user employs a pointer such as a stylus to select various options presented on display screen 52 by the system. The options are presented in a series of menus and dialog boxes. If the user is in the "notepad" application, the screen 52 may initially appear as shown in FIG. 5. If the user desires to route "note 1" as shown there, he or she will first tap the routing button icon 51c with stylus 38. In response, an action menu 284 appears beside the routing icon as shown in FIG. 6. The top of this menu shows four different routing actions available to the user. Additional routing actions could be included if they are available to the system.

Figure 9:
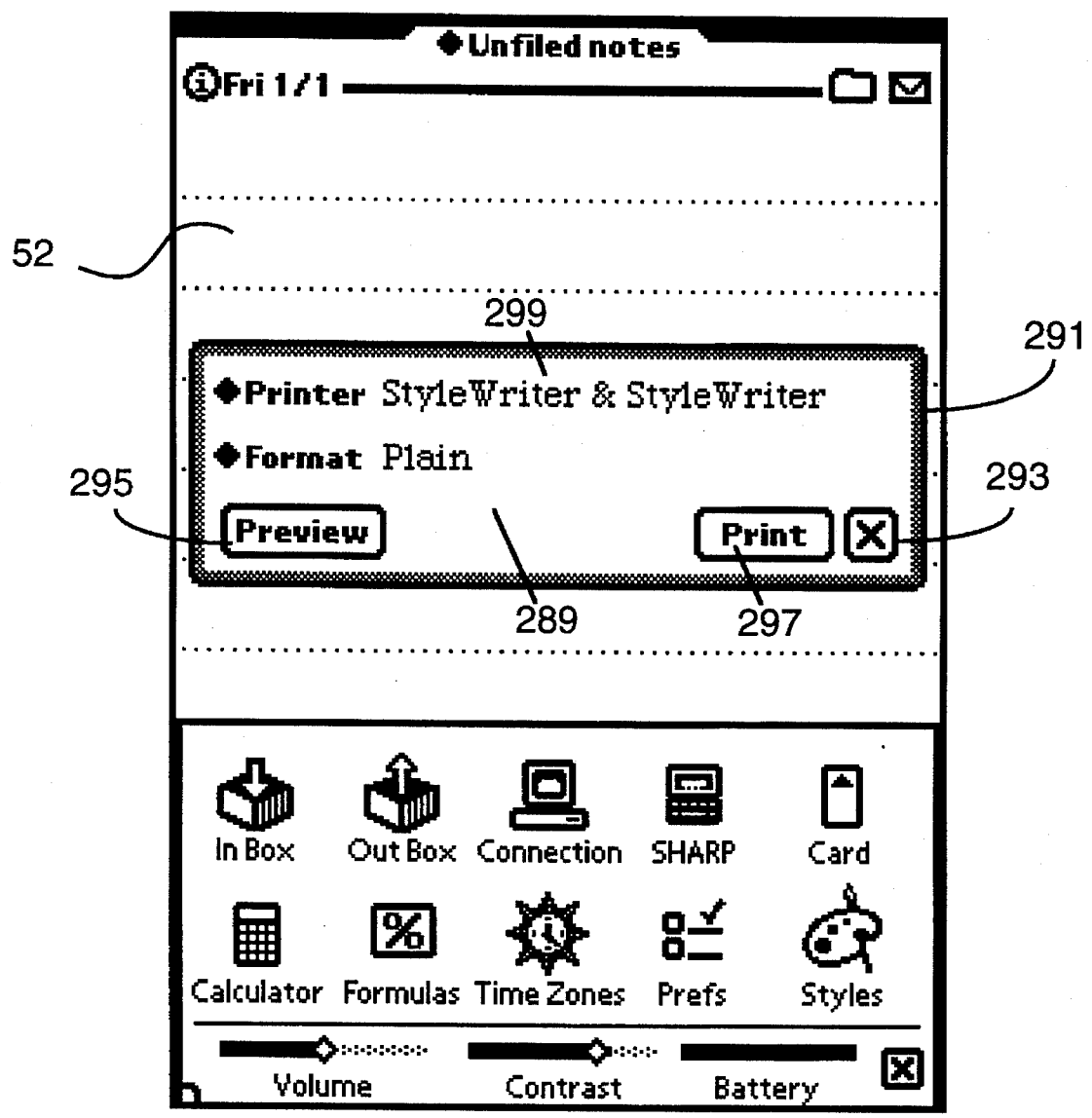
FIG. 9 is an illustration of the computer system's display screen displaying a routing slip for a print action.

Next, the user taps the particular routing action he or she desires on the action menu. This causes a routing slip 291 to appear on screen 52 as shown in FIG. 9. The routing slip typically includes various fields describing aspects of the routing action. For example, if the action is PRINT NOTE (as shown in FIG. 9), the routing slip will identify the destination (e.g., the name of the printer) and the format (e.g. "plain") of the document being routed. The routing slip provides the user with other options such as canceling the action (by tapping the "X" button 293), previewing the print document by tapping the "PREVIEW" button 295, or simply printing by tapping the "PRINT" button 297. Other options may be available depending upon the routing action selected.

Figure 10:
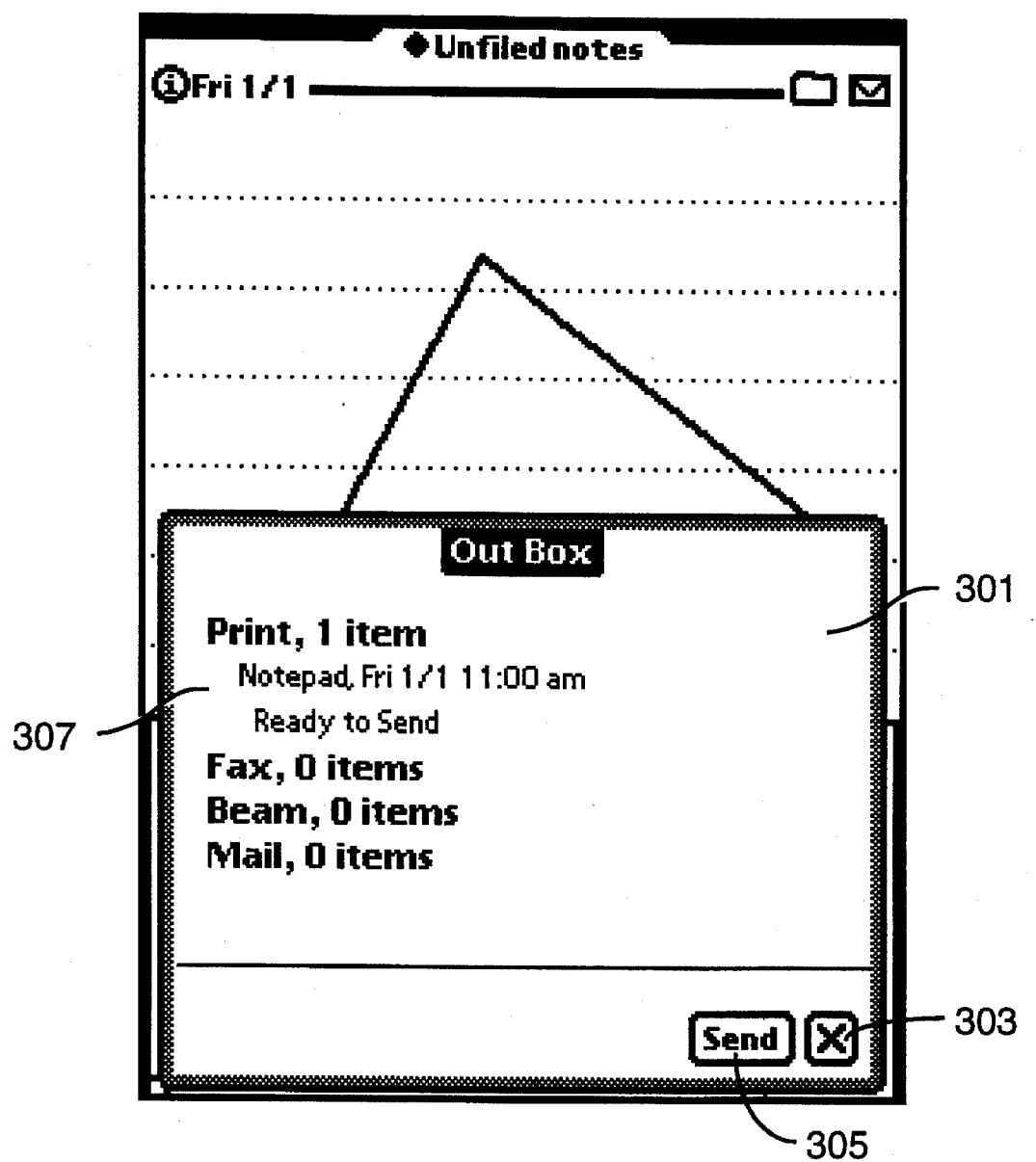
FIG. 10 is an illustration of the computer system's display screen displaying an out box window containing one item to be printed.
Figure 12:
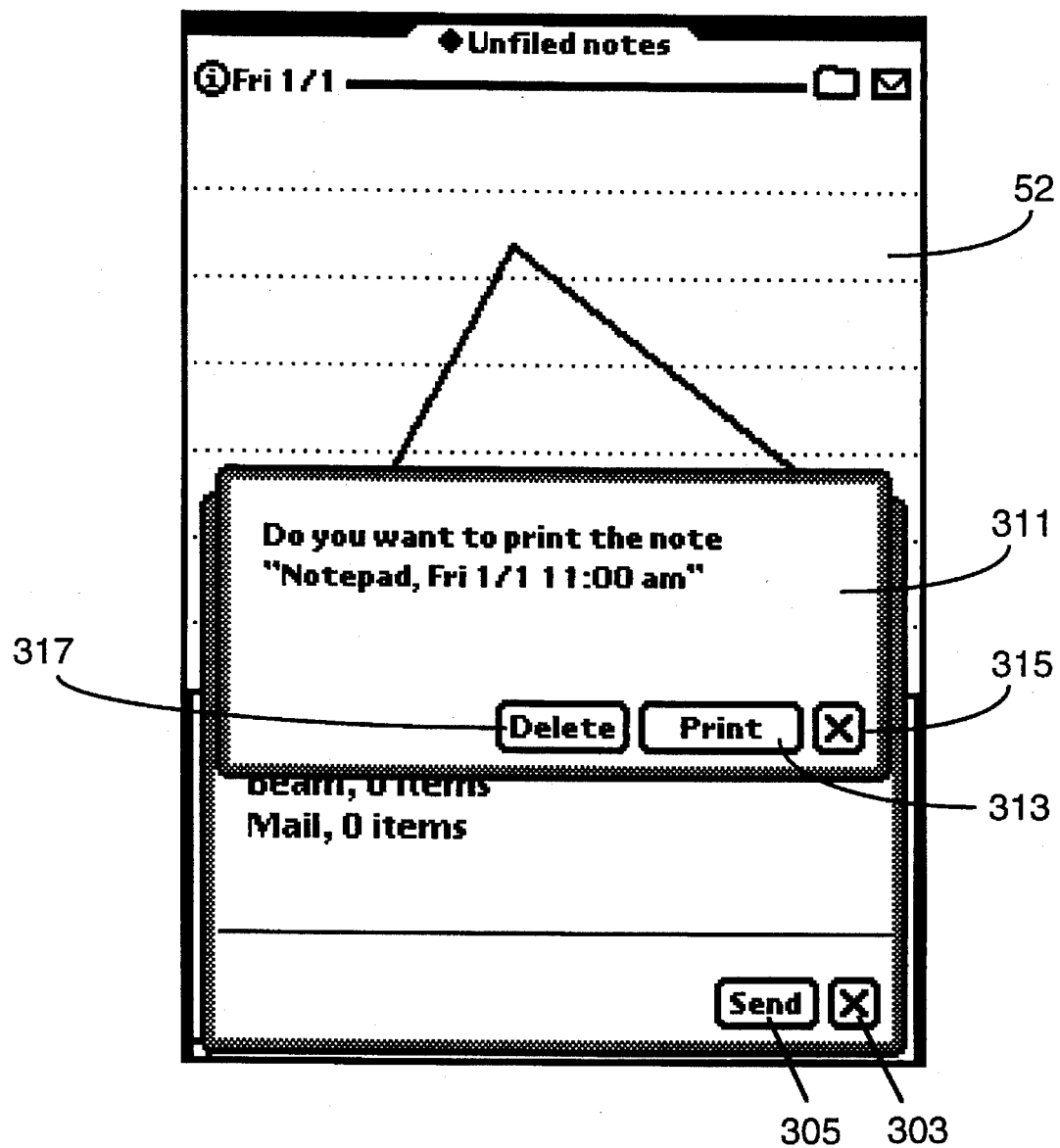
FIG. 12 is an illustration of the computer system's display screen displaying an out box item action dialog box for an item to be printed.

Thereafter, the document with appropriate routing instructions supplied from the routing slip is sent to an out box 301 as shown in FIG. 10. Upon receiving the document, the out box 301 automatically opens a window displaying a complete list of pending actions. The pending actions are divided into groups depending upon what type of routing action is employed. In the example shown in FIG. 10, the actions include printing, faxing, beaming, and mailing. Each individual document to be routed is listed in the out box under the appropriate heading. If the user wishes to close the out box, he or she simply taps the cancel ("X") button 303. If the user taps on the document entry listed in the out box (e.g., the entry 307 "Notepad, Fri Jan. 1 11:00 am" shown in FIG. 10), an item action dialog box 311 will appear as shown in FIG. 12. Buttons 315, 317, and 313 in this dialog box give the user the option of canceling the print job, or deleting or printing the document. If the user taps the print button 313, the document will be printed.

Figure 13:
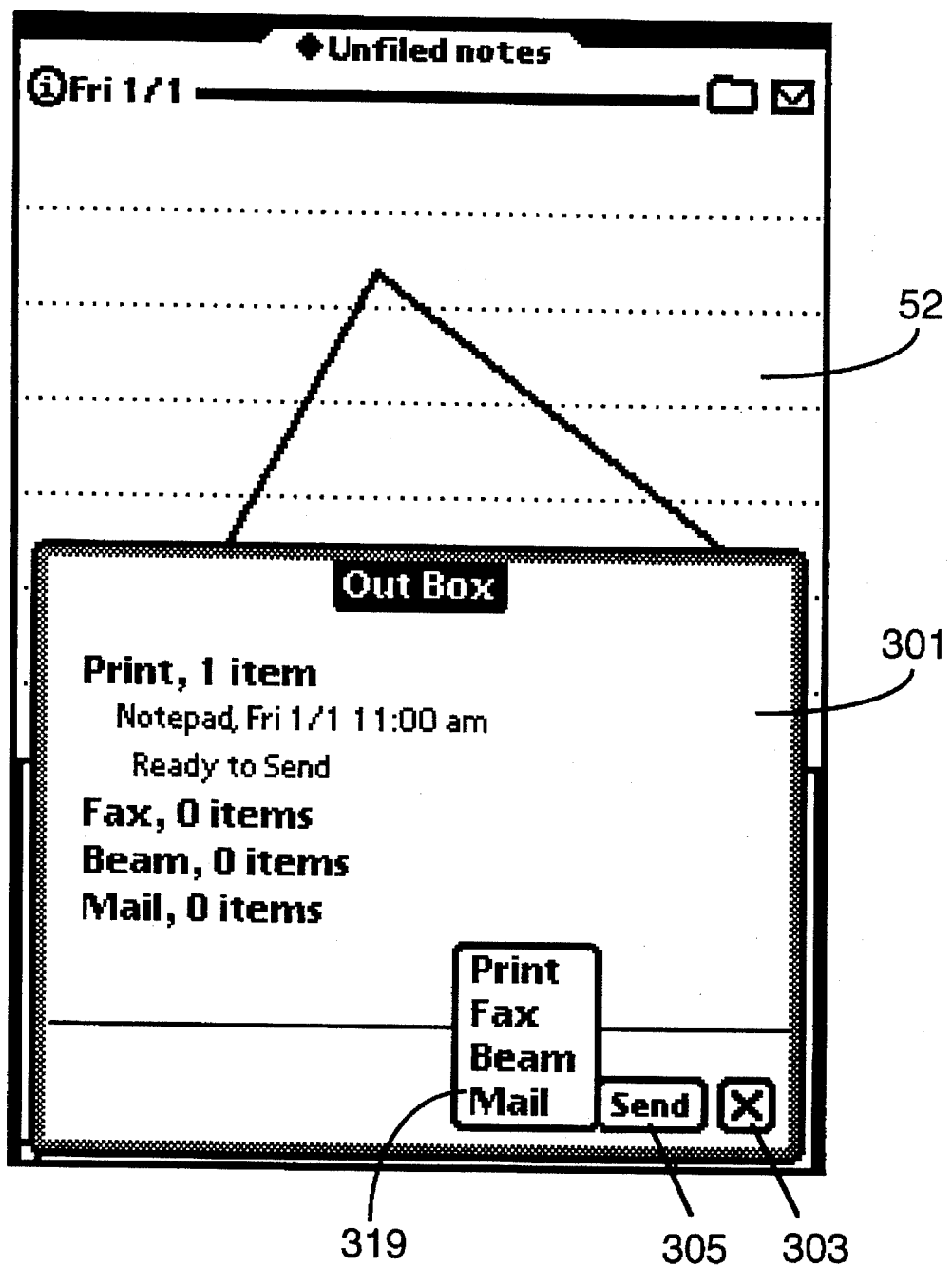
FIG. 13 is an illustration of the computer system's display screen displaying an out box action menu displayed in response to a send command.

As shown in FIG. 10, the out box has a "SEND" button. If the user taps this button, he or she will be given the option of routing not just a single document but every document pending in the out box that is to be sent by a particular type of routing action. For example, if there are three items listed under "PRINT" in the out box, the user can send them all at one time. This is accomplished by first tapping the SEND button to generate an out box action menu as shown in FIG. 13. Then when the user taps PRINT from this menu, all print items from the out box are printed. If the user selects another option, e.g. "FAX", all fax items in the out box will be faxed. In the example shown in FIG. 13, no items will be faxed because there are no fax items in the out box.

Referring now to FIG. 3, a screen display 52 is shown as it appears after the drawer ("extras") icon has been selected. Specifically, window 55 opens to display a series of available applications including an out box icon 57 and an in box icon 59 which are particularly relevant to this invention. Although the out box and in box windows will open automatically during certain routing process steps, they can be opened at any time by first tapping the drawer icon and then selecting an out box or in box icon 57 or 59 as appropriate from the displayed collection of extra applications. Once opened they function the same as described above.

Figure 4:
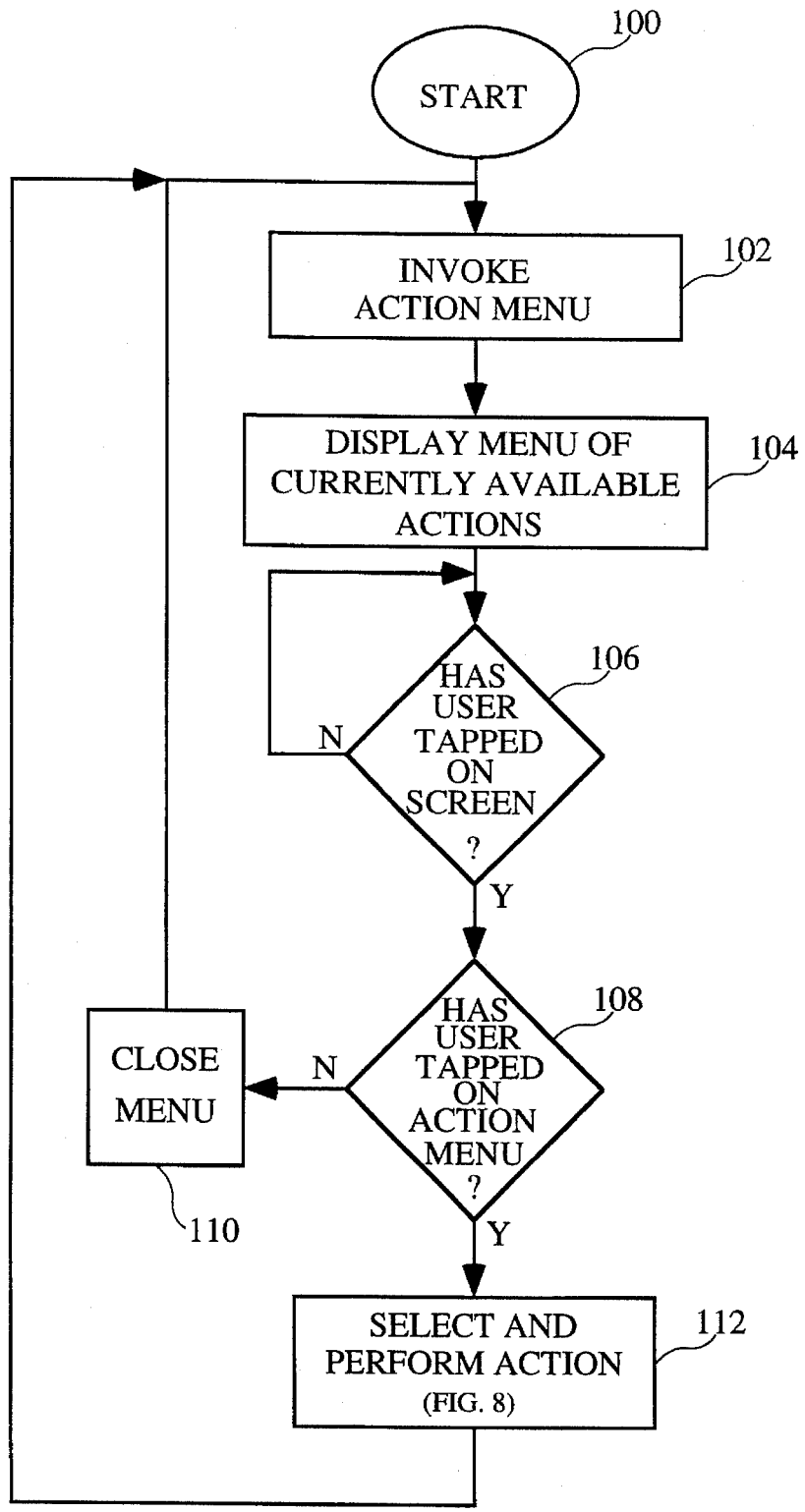
FIG. 4 is a process flow diagram showing primary steps involved in selecting and performing a routing process according to the present invention.

Turning now to FIG. 4, an overview of the process flow of this invention is presented. The process begins at 100 and proceeds to process step 102 where the action menu is invoked. In a preferred embodiment, this is accomplished by selecting routing icon 51C shown in FIG. 5. The process then continues with a process step 104 where a menu of the currently available actions is displayed. A preferred action menu 284 is shown in FIG. 6 as discussed above. At this point, the user typically selects one of the displayed action. The process accounts for this in two decision steps. First, the process moves to a decision step 106 which determines whether the user has tapped on the screen. As long as the user has not tapped on the screen, the process returns to decision step 106 to await a tap. When the user does tap on the screen, the process moves to a decision step 108 which determines whether the user has tapped on the action menu itself. If the answer is yes, the process proceeds to a step 112 where the system determines which action has been selected, and then performs that action. Thereafter, the process control returns to step 102. If decision step 108 determines that the user has tapped screen 52 in a region outside of the action menu, the process proceeds to a step 110 where the action menu is closed. When this happens, the screen 52 returns to its original display as shown in FIG. 5, for example.

FIG. 5 is a screen illustration showing how screen 52 appeared with the note pad application running on the computer. Three different notes (examples of documents or items) were displayed. At the top of each note, header 53 containing header bar 56 and the header function buttons 51A, 51B, and 51C was displayed. Of the function buttons, only the routing button 51C—shown as an envelope icon—is particularly relevant to this invention.

FIG. 6 shows a screen illustration of the screen 52 as it appeared after the routing button 51C had been tapped in "note 1". A routing action menu 284 appeared in the upper right region of the screen as shown. As shown, the action menu was divided by a divider 288 between a first set of actions 286 "PRINT NOTE", "FAX", "BEAM", "MAIL" and a second set of actions "DUPLICATE", "DELETE". This division is somewhat arbitrary, but for purposes of this application it will serve to distinguish the "routing actions" (printing, faxing, beaming, etc.) which transfer an item out of the computer system and "direct actions" which act on an item without routing out of the system. Of course, routing menus having other organizations could also be employed. Regardless of how which actions are displayed on menu 284, the user selects a routing command for processing by touching the stylus 38 to the region of screen 52 where that routing command was displayed on menu 284.

Figure 7A:
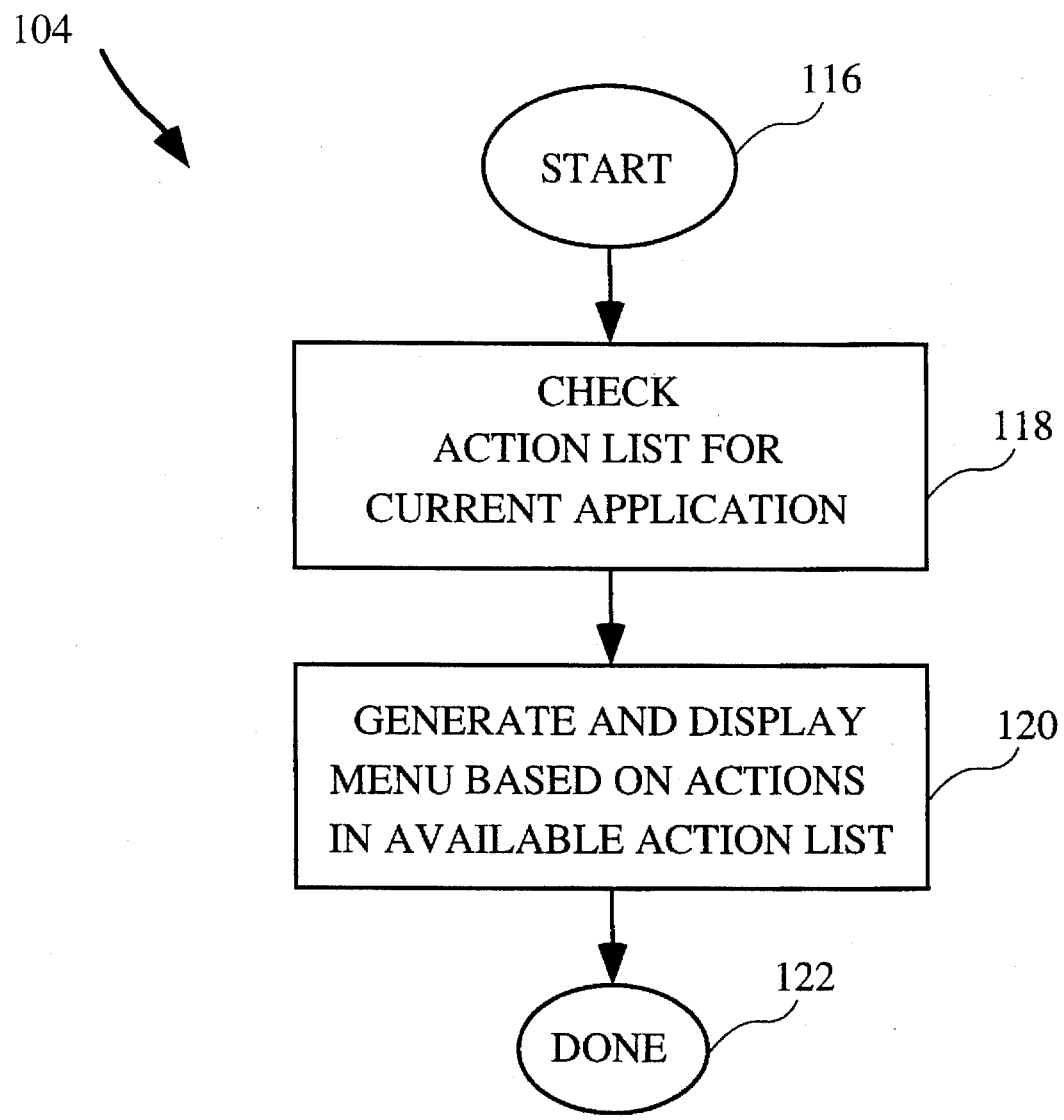
FIG. 7a is a process flow diagram showing the steps employed to generate an action menus.

Step 104 of FIG. 4 requires that the system display a menu of "current available actions". The procedure by which the system determines which actions are "currently available" is detailed in FIG. 7a. This process begins at 116 and proceeds to a step 118 which checks an available action list for the current application. The current application is typically that application which is open and has created the document to be routed. In the example shown in FIGS. 5 and 6, the current application is the notepad application. Of course, other applications such as a calendar or rolodex could also serve as the current application if they were open and had created the document being routed. The structure of the action list is described in more detail below with reference to FIG. 7b. From step 118, the process moves to a step 120 which generates and displays the action menu so that it includes the available actions in the action list. Thereafter, the process is concluded at step 122.

Figure 7B:
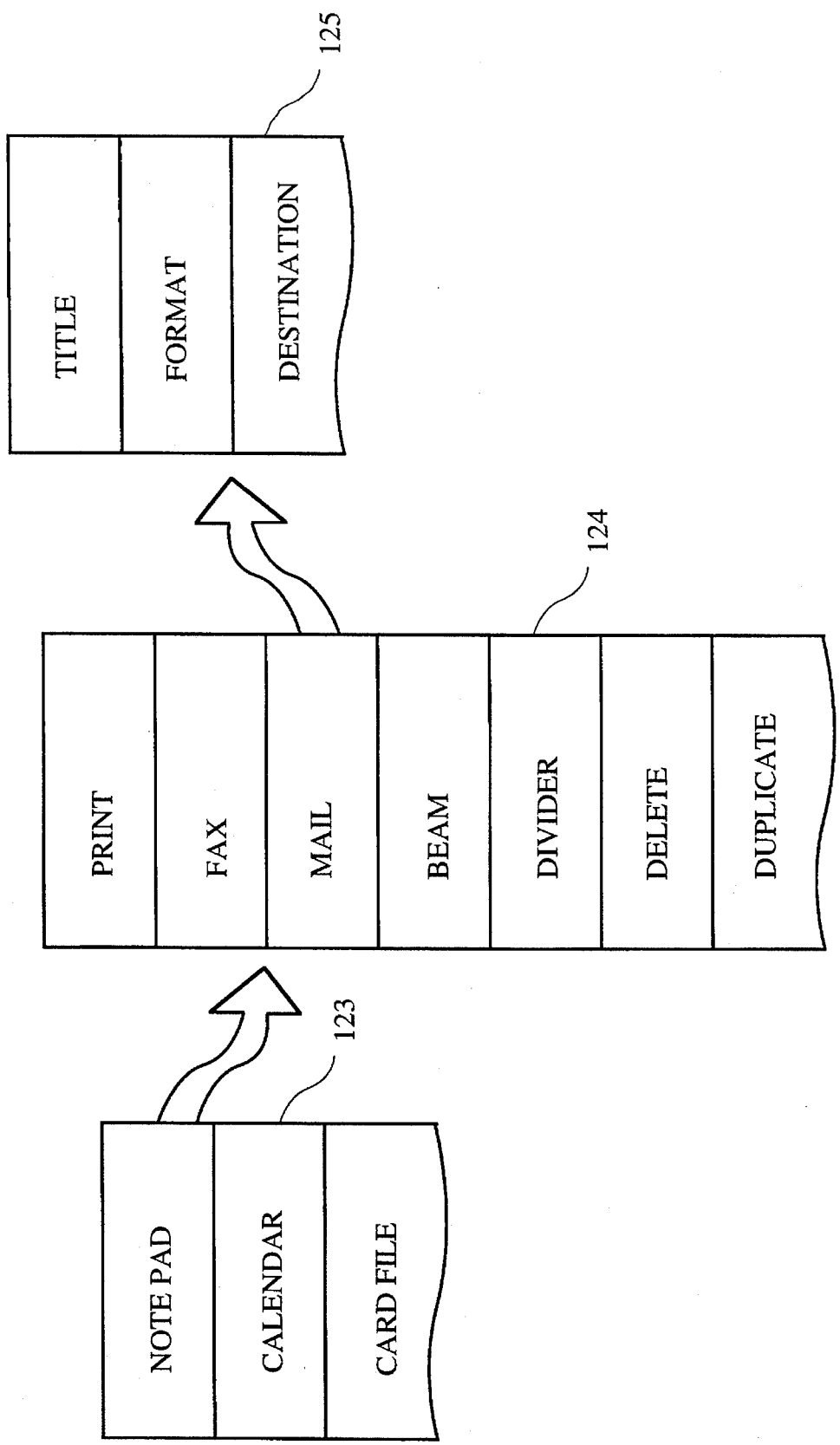
FIG. 7b is a schematic illustration of an action list according to the present invention.

The action list consulted in step 118 preferably includes a table of scripts describing the various available actions and the specific applications to which they are available. FIG. 7b shows how a preferred action table might be organized. At the first level 123 is a list of applications in the computer system. As noted above, these might include, for example, a NOTE PAD, a CALENDAR, a CARD FILE, etc. Within each application section of the action list is a list of currently available actions 124. For example, the NOTE PAD application may have PRINT, FAX, MAIL, BEAM, DELETE, and DUPLICATE actions available to it. This list determines which actions will be displayed in action menu 284. Thus, at step 118, the system simply reviews the action list to determine which actions are visible under the current application. Those actions that are visible are listed in the action menu. Within each action section of the actions list is a sublist of various document-specific features 125. As shown for a MAIL action these might include the document title, the document format, the document destination, etc. This information is typically displayed within fields of a routing slip for the particular action as described in more detail below.

As noted above, the list of actions in FIG. 6 includes print note, fax, beam, and mail. Other actions can, of course, be added as they become available. Further, some actions will become available only after some event occurs in the system. For example, if a user inserts a PCMCIA card in an appropriate slot on the computer system, the direct action "COPY TO CARD" may become available. This would then also be displayed on action menu 284. In other words, the action "COPY TO CARD" is always in the list of actions, but it is "invisible" if a card is not inserted.

When new actions become available to the system, an application developer can make use of them by simply modifying the action list to include scripts for the new actions. Because the scripts for these new actions often describe little more than a new menu item or routing box field, they can be quickly incorporated within the action list. Therefore, developers need spend only minimal time updating their applications.

Figure 8:
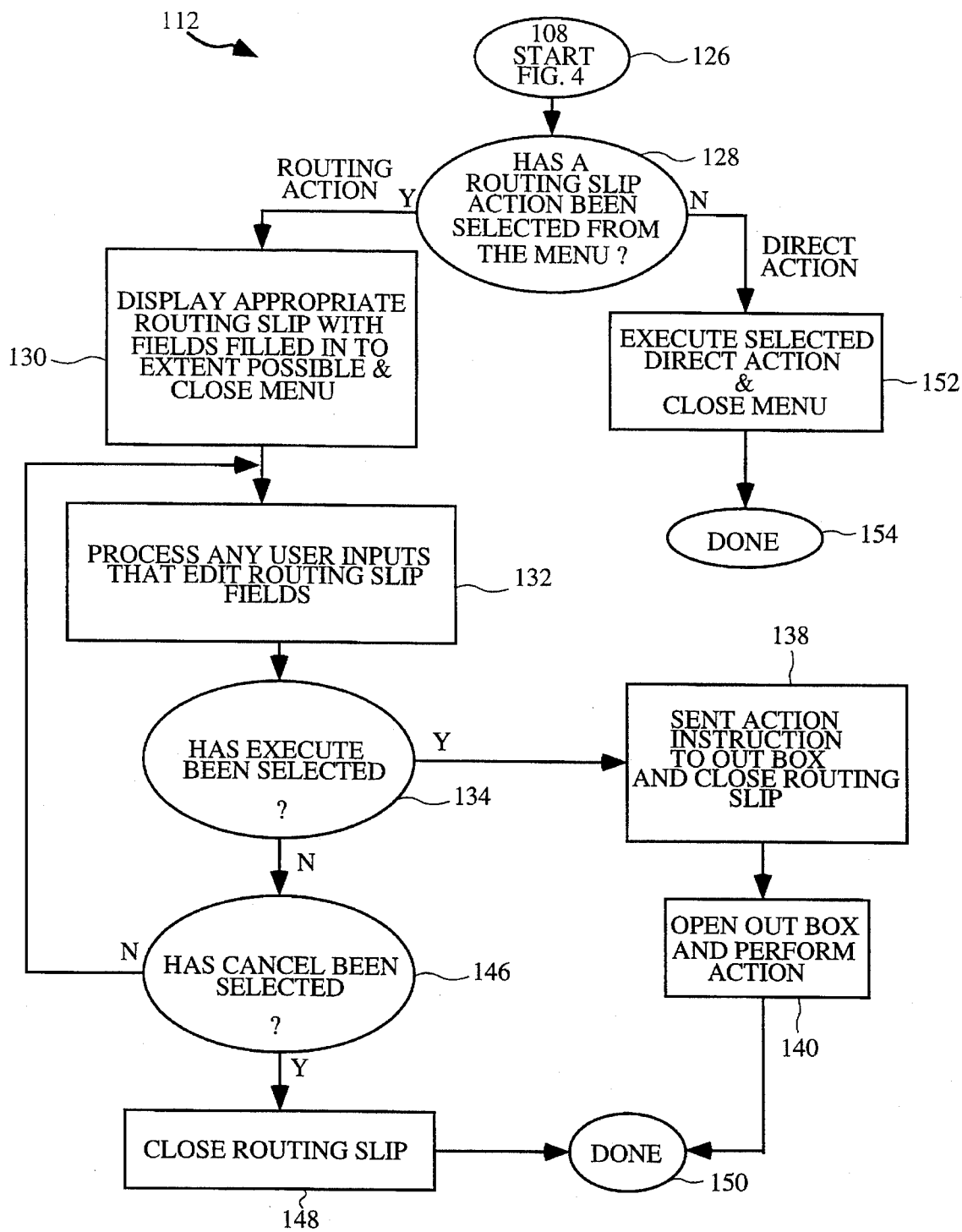
FIG. 8 is a process flow diagram showing the steps employed to perform a routing action according to the present invention.

Turning now to FIG. 8, the process of selecting and performing an action listed on the action menu (step 112) is detailed. The process begins at 126 and proceeds to a conditional step 128 which determines whether a "routing slip action" has been selected from the menu. The routing slip actions are distinguished from "direct actions" such as "duplicate" and "delete" which are listed below the divider on action menu 284. If step 128 determines that a routing step action has been selected, the process proceeds to a step 130 where the appropriate routing slip is displayed. As noted, routing slips include fields for various features of the document being routed. The system will generally attempt to fill in these fields to the extent possible by some default procedure. However, the user has the option of editing the routing slip fields if necessary. Thus, after the routing slip is displayed at step 130, the process moves to a step 132 where any user inputs editing the routing slip fields are processed. Whether or not there are user inputs editing the routing slip, the process proceeds to a decision step 134 which determines whether an execute button has been selected. As shown in FIG. 9, the routing slip will have an "EXECUTE" button (shown as a "PRINT" button). If decision step 134 determines that the execute button has been selected, the process moves to a step 138 where action instructions are sent to an out box and the routing slip is closed. Thereafter, the process moves to a step 140 where the out box is opened and selected actions are performed. The process is then completed at 150.

As noted, decision step 134 determines whether the EXECUTE button has been selected. If the execute button has not been selected, another button may have been selected such as the "CANCEL" button (shown as an "X" in FIG. 9). Thus, if the answer to the query in decision step 134 is negative, the process moves to a decision step 146 which determines whether the CANCEL button has been selected. If so, the process moves to a step 148 where the routing slip is closed. The process is then completed at 150. If the CANCEL button has not been selected, process control returns to step 132 where the system checks for any user inputs editing the routing slip. Thereafter, the system again checks to see whether the execute or cancel buttons have been selected. For some actions such as the PRINT action, other buttons may be present on the routing slip. Selection of these buttons will be processed according to steps that are specific for each routing slip.

At the first decision step in the process illustrated in FIG. 8 (step 128), the system determines whether the action selected from the menu is a routing slip action. If it is not, the process moves to a step 152 where the selected direct action is executed. Thereafter, the menu is closed and the process is completed at 154. As noted above, direct actions are arbitrarily designated to include the actions duplicate the document, delete the document, copy of the document, etc.

In process step 130 of FIG. 8, the system displays a routing slip having fields filled in by the system to the extent possible. Various procedures may be employed by the system to decide what, if any, information is supplied to the various fields. In some embodiments, the system will fill in the fields with the same information used in the previous routing slip for the selected action. Further, some of the information may be available from the routed document itself. For example, title and subject matter fields are provided in documents created by some mail applications. This information would automatically be supplied to routing slips for such mail applications. Still further, some form of "intelligent assistance" might be employed by the system to fill in the fields. For example, the system might pick an appropriate destination for a facsimile based upon a name appearing in the content of the routed document. In some embodiments, the assistance function will automatically display a routing slip when it appears from the user's notes that he or she wishes to route a document. This will occur without the user specifically selecting a routing action from a menu, etc. Intelligent assistance in pointer-based computer systems is discussed in more detail in U.S. patent application Ser. No. 07/889,225, filed on May 27, 1992, naming Luciw as inventor, and entitled "Deducing User Intent . . . ".

An exemplary routing slip 291 is shown on screen display 52 in FIG. 9. In routing slip shown includes a "printer" heading and an adjacent printer field 299 or destination in which the destination printer is specified. In this example, the destination printer is identified as "Style Writer". Underneath the printer heading is a "format" heading and an adjacent format field 289 in which the format of the document to be printed is specified. In this example, the format is "plain".

As noted in the discussion of FIG. 8, documents are sent to an out box from which the routing action can be performed (steps 138 and 140). Before then, all steps taken in processing the routing action involved an application and the action list. Once the document is sent to the out box, however, the application and action list are no longer involved in the routing. At this point, the out box and an associated out box categories list (somewhat analogous to the action list) take over the routing steps.

An exemplary out box window 301 is shown in FIG. 10. As noted, the out box window includes a number of headings ("PRINT", "FAX", "BEAM", and "MAIL" in this example) specifying the routing actions available to the system. Entries for each out box item to routed are listed under the appropriate heading. In this example, there is one item to be printed (a note pad document) and no other items to be routed in any other manner. Thus, a print item entry 307 is listed under the "PRINT" heading. A "SEND" button 305 and a "CLOSE" button 303 are displayed in the lower right hand corner of the out box.

Figure 11:
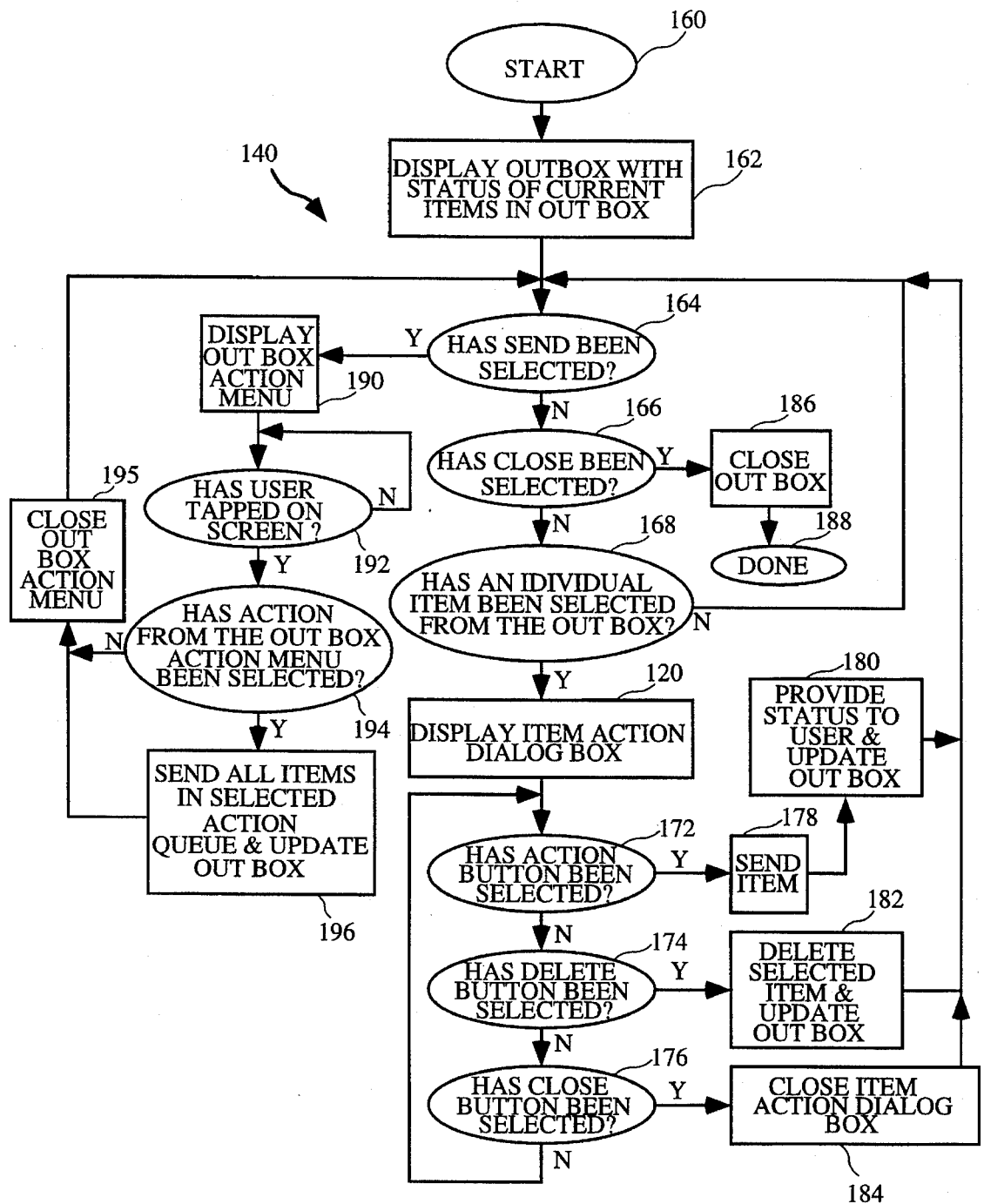
FIG. 11 is a process flow diagram showing the steps employed to perform a routing action from within an out box.

Details of the preferred routing procedure within the out box are provided in FIG. 11. The process starts at 160 and proceeds to a process step 162 where the out box is displayed with a list of current items. In preferred embodiments, the out box will open automatically when the user taps an "execute" button within the routing slip. In alternative embodiments, the out box will open only after the user instructs the system to open it. As noted above, the out box window can be opened by selecting the out box icon from the list of extra items shown in FIG. 3. After the out box has been displayed, the system awaits input from the user. The user can elect to send all items of a particular routing type by tapping the "SEND" button, can close the out box by tapping the "X" button, or can elect to route a particular item in the out box by tapping that item. Thus, after the out box has been displayed by step 162, the process proceeds to a decision step 164 which determines whether the SEND button has been selected. If not, the system proceeds to a decision step 166 which determines whether the CLOSE button has been selected. If not, the process proceeds to a decision step 168 which determines whether an individual item has been selected from the out box (e.g., the notepad entry under "PRINT, 1 ITEM" in FIG. 10). If decision step 168 is answered in the negative, process control returns to step 164 where the system awaits further user input. In other words, the system continues to cycle through decision steps 164, 166, and 168 until the user has selected a button or item from the out box. If the CLOSE button has been selected at decision step 162, the process moves to a step 186 where the out box is closed and then to 188 where the process is completed. It should be noted that in this embodiment the out box can be closed only by selecting the CLOSE button.

If the user selects an individual item, the process moves from decision step 168 to a process step 170 where an item action dialog box is displayed. An exemplary item action dialog box 311 is shown in FIG. 12. As can be seen, the dialog box asks the user to confirm that the desired routing action (in this case printing) is to be executed. This action is performed after the user selects print button 313. Alternatively, the user could elect to delete the item to be routed or close the item action dialog box by selecting either the delete or close buttons 317 or 315, respectively. The dialog content of the item action dialog box is specified by the out box category list. In fact, each category in the out box category list can determine what to display when the user taps a particular item listed in the out box. Other dialog boxes and menus associated with the out box—including the out box window itself—display entries or dialog as specified in the out box categories list. The out box category list is coarsely divided into routing action types or categories. Within each category, the out box category list indicates what items are in the out box action queue.

In an alternative embodiment, a out box routing slip is displayed prior to displaying item action dialog box in step 170. This routing slip contains much the same information as contained in the routing slips described above. In fact, it may identically duplicate the content of the above routing slips. This approach has the benefit of allowing the user another opportunity to edit the format, destination, and other parameters specified in the original routing slip.

Returning to the process displayed in FIG. 11, after the item action dialog box has been displayed (step 170), the process moves to a decision step 172 which determines whether the EXECUTE or "action" button has been selected. If so, the process moves to a step 178 where the routing action is performed on the selected item. Thereafter, the process moves to a step 180 which provides the status of the routing action to the user and updates the out box. From there, process control returns to decision step 164 where the system awaits further input from the user.

If the query posed in decision step 172 is answered in the negative, the system determines whether the DELETE or CLOSE buttons in the item action dialog box have been selected. Specifically, a decision step 174 determines whether the DELETE button has been selected. If so, the process moves to a process step 182 where the selected item is deleted and the out box is updated to reflect this fact. From there, process control returns to decision step 164. If the system determines that the delete button has not been selected at step 174, a decision step 176 determines whether the CLOSE ("X") button has been selected. If so, the process proceeds to a step 184 where the item action dialog box is closed without taking further action on the selected item. Thereafter, process control returns to decision step 164. If decision step 176 determines that the CLOSE button has not been selected, process control returns to decision step 172 and the system continues to loop through decision steps 172, 174, and 176 awaiting further user input on the item action dialog box.

As noted, decision step 164 determines whether the "SEND" button from the out box has been selected. If it has, an out box action menu 319 is displayed in a process step 190. As shown in FIG. 13, the out box action menu 319 is displayed beside send button 305 and includes a list of the routing actions available to the system (in this case "PRINT", "FAX", "BEAM", and "MAIL").

After the out box action menu has been displayed, the system waits for the user to tap screen 52. Thus, after step 190 (in FIG. 11), the process proceeds to a decision step 192 which determines whether the user has tapped on the screen. If not, the process control simply returns to decision step 192. If, on the other hand, the user has tapped screen 52, the process proceeds to a decision step 194 which determines whether an action from the out box action menu has been selected. If this query is answered in the negative, the out box action menu is closed at step 195 and process control returns to decision step 164. If decision step 194 determines that an action from the out box action menu has been selected, the process proceeds to a process step 196 where all items in the selected routing action out box queue are actually routed. The out box is then updated to reflect this fact. Thereafter, the process proceeds to step 195 where the out box action menu is closed. Process control then returns to decision step 164.

In an alternative embodiment, the routing action is performed automatically immediately after the out box is displayed at step 162. Thus, after the user selects the EXECUTE button from the routing slip, no further user input is required. The out box is simply opened and the routing process is executed. Within a given set of routing actions, some may be processed according to this alternative embodiment, while others are processed according to the preferred embodiment described above in connection with FIG. 11. Thus, for example, in one embodiment the "BEAM" action is processed automatically according to the alternative embodiment, while the other actions (print, fax, mail) are processed as shown in FIG. 11.

Figure 14:
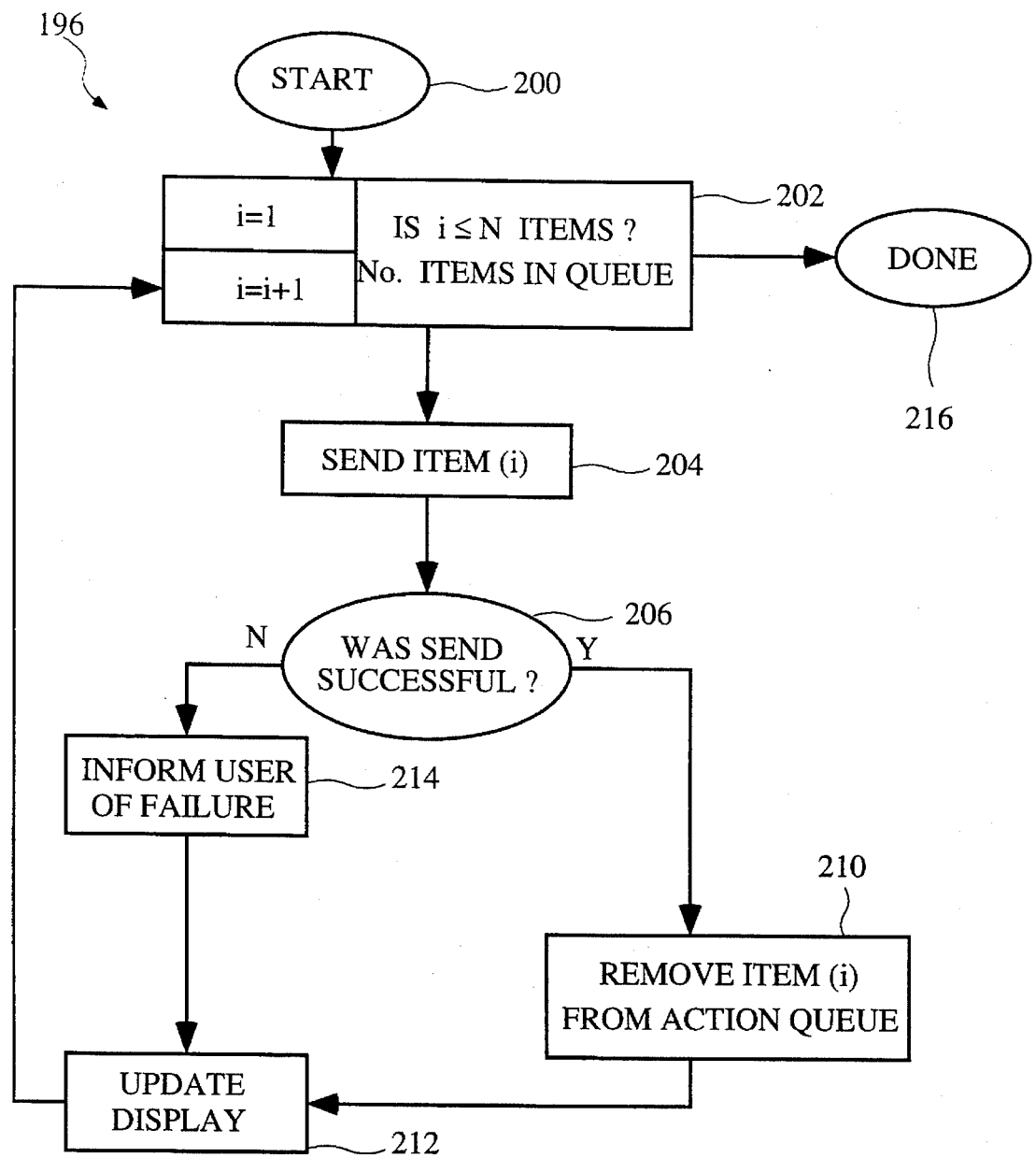
FIG. 14 is a process flow diagram showing the steps employed to send all items in an action queue.

FIG. 14 illustrates the procedure by which all items in a selected action queue are routed (step 196 of FIG. 11). The process begins at 200 and proceeds to iterative loop step 202 which initializes an item counter "i" to one and compares the current value of "i" to the variable NITEMS. NITEMS is the number of items to be processed in the queue for a particular out box action. As long as i is less than or equal to NITEMS, iterative loop step 202 directs the process to a step 204 where item (i) is sent (printed, faxed, etc.). Thereafter, the process proceeds to a decision step 206 which determines whether the SEND was successful. If so, the process proceeds to a step 210 where item (i) is removed from the action queue. Thereafter, the process moves to a step 212 where the out box display is updated, and from there to iterative loop step 202 where the counter i is incremented by one. The process then proceeds again to step 204 where the next item (i) is sent. Thereafter, the above procedure is again followed. If for any reason the SEND action was unsuccessful, decision step 206 directs the process to a step 214 which informs the user of the failure. From there, the process proceeds to step 212 where the display is updated. Process control then returns to iterative loop step 202. Iterative loop step 202 continues to direct the process to step 204 until the counter i is greater than the value of NITEMS. At that point, all the items in the queue have been sent and the process is completed at step 216.

Figure 15:
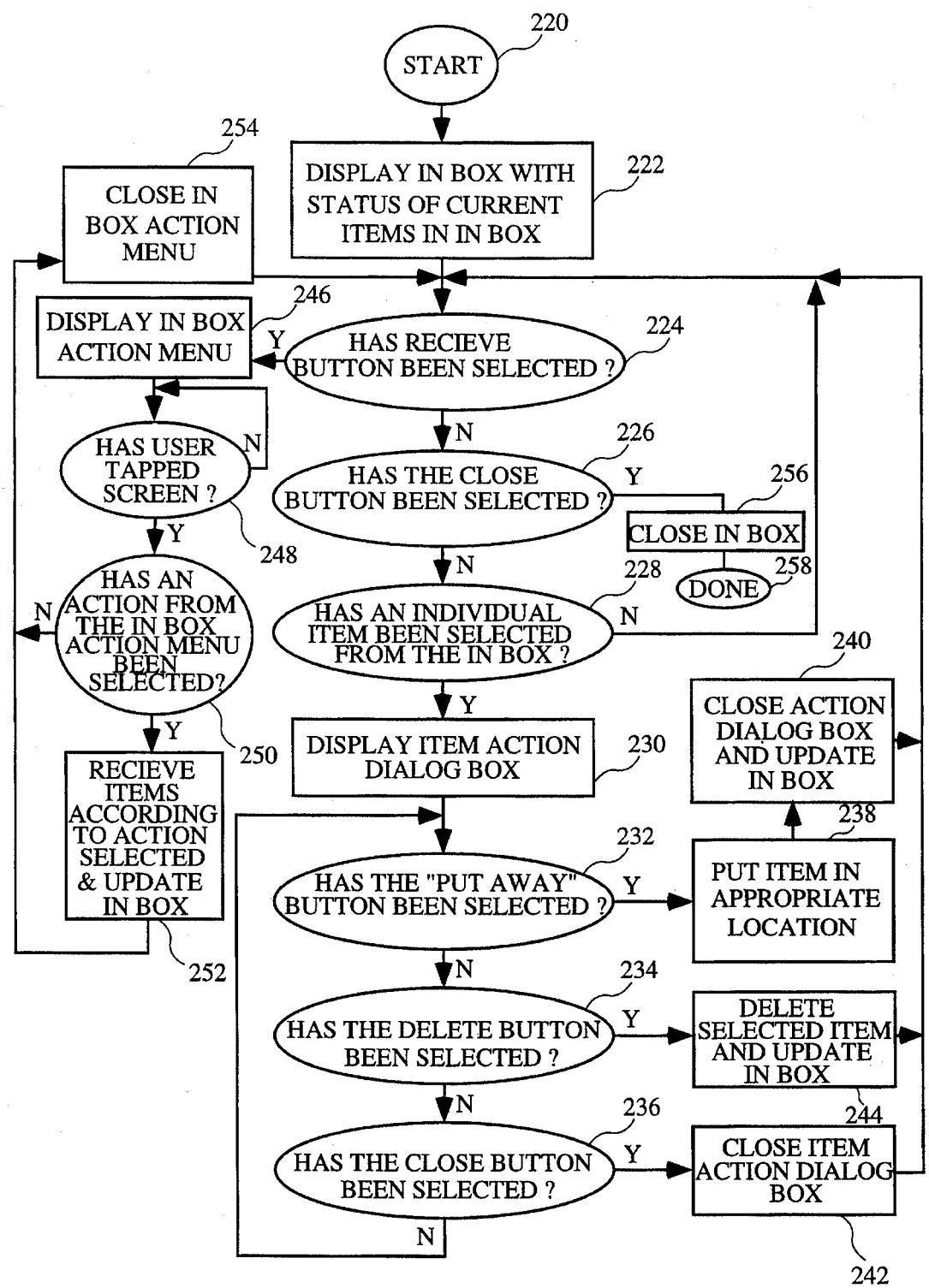
FIG. 15 is a process flow diagram showing the steps employed to perform a receiving action from within an in box.

An "IN BOX" is a "receiving" counterpart to the out box. It serves as a holding region for incoming items and it presents a consistent interface allowing the user to act on these items. Exemplary items processed through the in box include incoming faxes, electronic mail, beam messages, etc. The procedure by which items are routed through the IN BOX is illustrated in FIG. 15. The process begins at 220 and proceeds to a step 222 where the IN BOX is displayed with a list of the current items contained therein. As noted above, the in box can be displayed at any time by tapping the "extras" button on the system and then selecting the in box icon displayed in the extras window (see FIGS. 3 and 9 for example).

Figure 16:
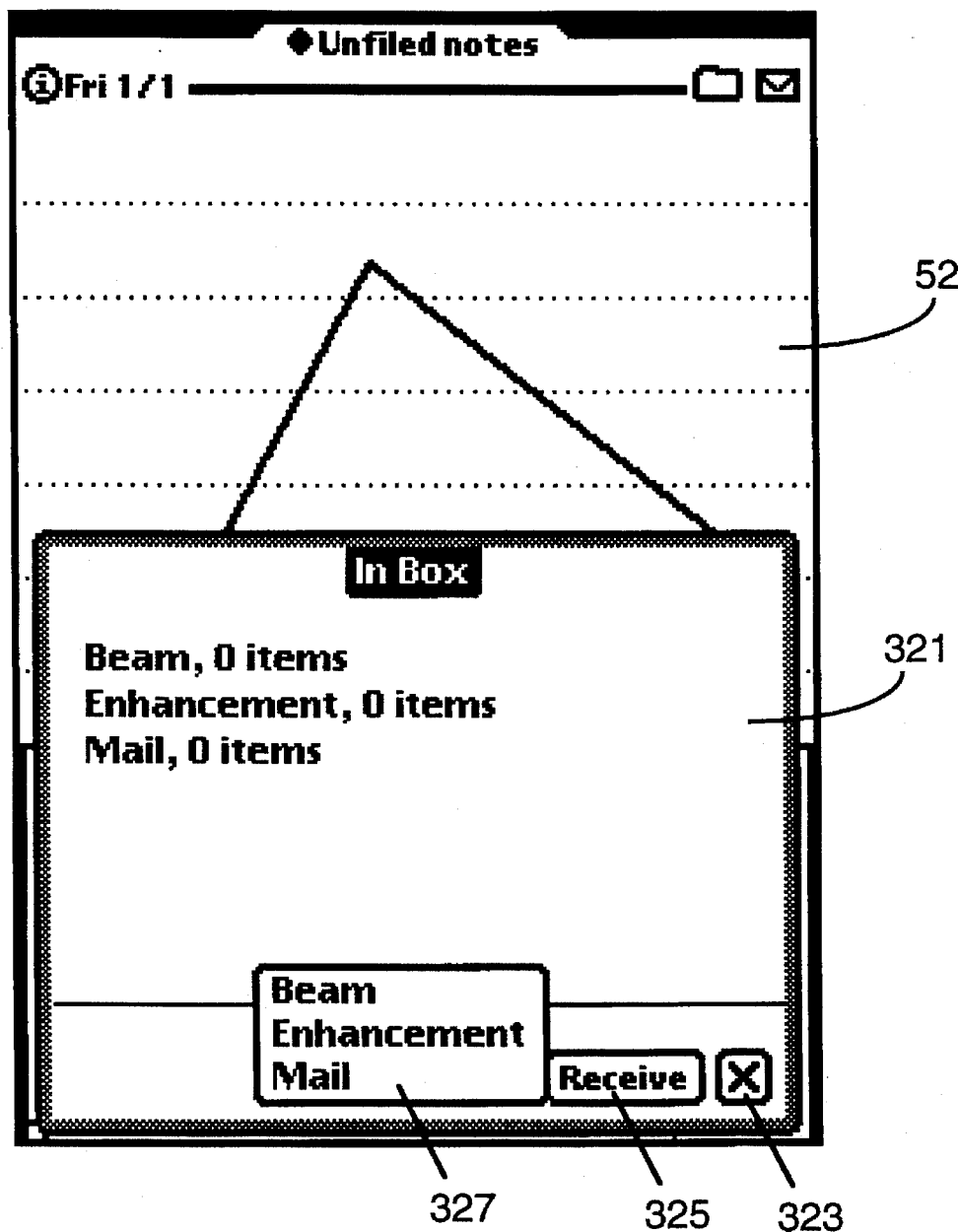
FIG. 16 is an illustration of the computer system's display screen displaying an in box window with an in box action menu displayed.

An exemplary in box window 321 displayed on screen 52 is shown in FIG. 16. Note that at the base of the in box, a "RECEIVE" button 325 is displayed alongside a "X" (or cancel) button 323. When the "RECEIVE" button 325 is tapped, an in box action menu 327 appears. This menu is analogous to the out box action menu 319 shown in FIG. 13.

After the in box has been displayed at process step 222, the process proceeds to a decision step 224 which determines whether the RECEIVE button has been selected. If it has not, the process moves to a decision step 226 which determines whether the CLOSE button has been selected. If this button has also not been selected, the process moves to a decision step 228 which determines whether an individual item within the in box has been selected. If none of these buttons or items have been selected, process control returns to decision step 224. Thereafter, the process continues to loop through decision step 224, 226, and 228 until one of the decisions has been answered in the affirmative (i.e., the user has selected a button or an individual item in the in box).

If the user selects the CLOSE button ("X"), decision step 226 proceeds to a step 256 where the in box is closed. Thereafter, the process is completed at step 258. It should be noted that in this preferred embodiment, this is the only procedure that will close the in box. All other steps leave the in box displayed on screen 52.

If the user selects an individual item from the in box display, decision step 228 directs the process to a step 230 which displays an in box item action dialog box. Like the out box item action dialog box, the in box version includes DELETE and CLOSE buttons. In place of the EXECUTE button (e.g., the PRINT button in FIG. 12), the in box item action dialog box has a "PUT AWAY" button. After the in box item action dialog box has been displayed at step 230, the process moves to a decision step 232 which determines whether the "PUT AWAY" button has been selected. If not, the process proceeds to a decision step 234 which determines whether the DELETE button has been selected. If this button has not been selected, the process then proceeds to a decision step 236 which determines whether the CLOSE button has been selected. If none of these buttons has been selected, process control returns from decision step 236 to decision step 232. Thereafter, the process continues to loop through decision steps 232, 234, and 236 until the user selects a button on the in box item action dialog box.

If the user selects the PUT AWAY button, decision step 232 directs the process to a step 238 which puts the selected item in an appropriate location. The data structure of the item being routed will generally tell the system which application it is associated with. Thus, the system will then put the document in a region of memory reserved for documents associated with the particular application. After the item has been put in the appropriate location at step 238, the process proceeds to a step 240 where the in box action dialog box is closed and the status of the in box is updated. From there, process control returns to decision step 224. If the DELETE button is selected, decision step 234 directs the process to a step 244 which deletes the selected item and updates the in box to reflect this fact. Thereafter, process control returns to decision step 224. If the CLOSE button has been selected from the in box item action dialog box, decision step 236 directs the process to a step 242 where the item action dialog box is closed. From there, process control returns to decision step 224.

One example of putting away an item received in the in box includes the following sequence of events. First, a business associate of the computer system user sends her business card to the user's computer by e-mail or facsimile. After that card is received by the user's machine, it is directed to the in box. Thereafter an item action dialog box for that card is displayed and the user taps the put away button. The business card is then routed to the memory location associated with the card file application.

If the user selects the RECEIVE button displayed in the in box, decision step 224 directs the process to a step 246 which displays the in box action menu 327 shown in FIG. 16. This action menu shows the various routing action types that may be employed by the system to receive information. Exemplary actions include beaming, faxing, mailing, etc. The action menu displayed in FIG. 16 lists "BEAM", "ENHANCEMENT", and "MAIL". The term "ENHANCEMENT" shown in the action menu refers to additional capabilities and information that might be available from the vendor of the computer system. Such enhancements might be received by modem, beaming, etc. After the in box action menu has been displayed by step 246, the system waits for the user to tap the screen. Thus, from step 246, the process proceeds to a decision step 248 which determines whether the user has tapped the screen. If not, the process simply returns again to decision step 248. If, however, the user has tapped the screen, the process proceeds to a decision step 250 which determines whether an action from the in box action menu has been selected. If not (i.e., the user has tapped a region of the screen outside of the in box action menu), the process moves to a step 254 where the in box action menu is closed. From there, process control returns to decision step 224. If the user has tapped a specific action listed in the in box action menu, decision step 250 directs the process to a step 252 which receives items according to the action selected. Thereafter, the in box is updated and the process proceeds to step 254 and thereafter to decision step 224. Often, the system will receive only a single item at one time. However, if a series of items are to be sent by a particular routing action (e.g., beaming), those items must be processed in the sequence in which they are sent. In this case, an iterative loop analogous to that depicted in FIG. 14 is preferably employed to receive the various items in the queue.

While this invention has been described in terms of several preferred embodiments, there are alterations, permutations, and equivalents which fall within the scope of this invention. It should also be noted that there are many alternative ways of implementing the processes of the present invention. It is therefore intended that the following appended claims be interpreted as including all such alterations, permutations, and equivalents as fall within the true spirit and scope of the present invention.

What is claimed is:

1. A method of performing a routing action on a document in a pointer-based computer system having a processor, a display, and memory, the method comprising the following steps:

running an application on the processor, the application having a document associated therewith that is to be routed;

producing an action list in response to at least one selection gesture implemented by a pointing means, the action list containing a list of routing actions available to the application, and residing, at least in part, in the memory;

displaying on the display at least one window, the at least one window containing the list of routing actions available to the application;

selecting a routing action for the document from the list of routing actions;

subsequent to said selecting, transferring the document to an out box in communication with a plurality of ports and residing, at least in part, in the memory, the out box having a plurality of different groups and being arranged to associate the document with one of the different groups based on the selected routing action; and performing the routing action on the document via the out box.

2. The method of claim 1 wherein at least one of the one or more selection gestures is made by tapping the display with a stylus.

3. The method of claim 1 wherein the one or more menus includes an action menu displaying the list of routing actions from the action list and one or more direct actions selected from the group consisting of deleting the document, duplicating the document, and copying the document.

4. The method of claim 1 wherein the step of displaying on the display one or more windows includes a step of displaying a routing slip identifying the action to be performed and having one or more fields identifying a destination to which the document will be routed.

5. The method of claim 4 further comprising the following steps:

determining a probable destination from content in the document; and inserting the probable destination in the one or more fields identifying the destination of the document.

6. The method of claim 4 wherein the routing slip also has one or more fields specifying a document format.

7. The method of claim 1 wherein the step of performing the routing action on the document includes the following steps:

displaying on the display an out box window representing the out box and including an entry for the document and one or more buttons;

displaying on the display one or more dialog boxes in response to selection gestures on the one or more buttons, the one or more dialog boxes containing dialog according to instructions in an out box categories list residing, at least in part, in the memory.

8. A method of routing a document in a pointer-based computer system having display means and a memory, and running a computer-implemented application, the method comprising the following steps:

displaying on the display means an action menu including one or more routing action types associated with the application;

displaying on the display means a routing slip for a selected routing action from the action menu, the routing slip at least containing fields for defining parameters of a routing action type and containing an execute button for executing the selected routing action;

displaying on the display means, in response to a selection gesture for the execute button, an out box having regions for all available types of routing actions in the pointer-based computer, and having an entry for the document within the region of the out box for the selected routing action; and performing the selected routing action on the document in response to one or more selection gestures in the out box.

9. The method of claim 8 wherein the routing action types are selected from the group consisting of printing, faxing, beaming by electromagnetic radiation, and mailing.

10. The method of claim 8 wherein the action menu includes one or more types of direct actions in addition to the routing associated with the document.

11. The method of claim 10 wherein the direct actions are selected from the group consisting of deleting the document and duplicating the document.

12. The method of claim 8 wherein the pointer-based computer system is a stylus-based computer system.

13. The method of claim 12 wherein selection gestures are made by tapping a stylus on the display means at a location of a selected item.

14. The method of claim 8 wherein the fields for parameters of the routing action type in the routing slip include at least one field specifying a destination of the document being routed.

15. The method of claim 14 further comprising the following steps:

(a) analyzing the document to identify any information specifying a potential destination of the document; and (b) providing information identified in step (a) in the field for specifying the destination of the document being routed.

16. The method of claim 8 wherein the fields for parameters of the routing action type in the routing slip include at least one field specifying a format for the document being routed.

17. The method of claim 8 wherein the step of performing the selected routing action is initiated in response to a selection gesture at the location of the entry for the document within the region of the out box for the selected routing action.

18. The method of claim 17 further comprising a step of displaying an item action dialog box for the document.

19. The method of claim 8 wherein the out box includes a send button for performing one or more types of routing actions.

20. The method of claim 19 wherein the step of performing the selected routing action includes the following steps:

displaying an out box action menu listing all available types of routing actions in response to a selection gesture on the send button; and routing all documents in the out box having entries within the region of the out box for a routing action selected from the out box action menu.

21. A method of inputting an item in a pointer-based computer system having a display and memory, the method comprising the following steps:

receiving an item through a port in the computer system;

transferring the received item to an in box in communication with a plurality of ports in the computer system, the in box residing, at least in part, within the memory, the in box having a plurality of different groups and being arranged to associate the received item with one of the different groups based on their corresponding routing action;

displaying on the display an in box window representing the in box and listing the received item and any other previously received items held in the in box; and transferring at least one of the items listed, in response to a gesture, from the in box to a region of memory associated with an application.

22. The method of claim 21 further comprising a step of opening the application after transferring the item to the region of memory associated with the application.

23. The method of claim 21 wherein the pointer-based computer system is a stylus-based computer system including a stylus.

24. The method of claim 23 further comprising a step of displaying on the display an item action dialog box in response to the gesture selecting the item from the in box window, the item action dialog box containing a put away button which when tapped by the stylus instructs the computer system to transfer the item to the region of memory associated with the application.

25. A pointer-based computer system comprising:

processing means;

memory means coupled to said processing means;

a display coupled to said processing means;

a plurality of ports;

a plurality of computer implemented routing processes which run on the processing means and reside, at least in part, in the memory means;

an out box in communication with the plurality of ports and temporarily holding documents being routed by the routing processes, the out box residing, at least in part, in the memory means;

an out box window representing the out box and displayed on the display, the out box window containing a list of documents held in the out box; and an out box categories list containing instructions for dialog appearing in the out box window and other windows associated with the out box, the out box categories list residing, at least in part, in the memory means.

26. The computer system of claim 25 wherein the computer system is a stylus-based computer system and selection gestures are made by contacting the stylus with the display.

27. The computer system of claim 25 further comprising:

one or more computer implemented applications which run on the processor; and an action list residing, at least in part, in the memory means and containing a list of available routing processes for each of the one or more applications.

28. The computer system of claim 27 further comprising one or more menus displayed on the display, at least one of the menus containing the list of routing actions available to the application.

29. The computer system of claim 27 further comprising a routing slip window displayed on the display, the routing slip window being associated with a particular routing process and containing fields defining parameters of the routing process.

* * * * *